US012794103B2

(12) United States Patent
Raghavan et al.

(10) Patent No.: US 12,794,103 B2
(45) Date of Patent: Nov. 10, 2026

(54) MITIGATION OF ANTENNA PANEL MISALIGNMENT

(71) Applicant: QUALCOMM Incorporated, San Diego, CA (US)

(72) Inventors: Vasanthan Raghavan, West Windsor Township, NJ (US); Yu-Chin Ou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 26 days.

(21) Appl. No.: 18/769,074

(22) Filed: Jul. 10, 2024

(65) Prior Publication Data

US 2026/0018777 A1 Jan. 15, 2026

(51) Int. Cl.
*H01Q 1/12* (2006.01)
*H01Q 21/06* (2006.01)

(52) U.S. Cl.
CPC ........... *H01Q 1/125* (2013.01); *H01Q 21/061* (2013.01)

(58) Field of Classification Search
CPC ............................. H01Q 1/125; H01Q 21/061
See application file for complete search history.

(56) References Cited

U.S. PATENT DOCUMENTS 9,502,764 B2 11/2016 Au
2019/0131703 A1 5/2019 Meyer et al.
2020/0395986 A1 * 12/2020 Ligander .............. H04B 7/0617
2022/0094419 A1 3/2022 Tang et al.

FOREIGN PATENT DOCUMENTS

EP 1389735 A1 2/2004

OTHER PUBLICATIONS

International Search Report and Written Opinion issued in PCT/US2025/032859, mailed Sep. 24, 2025, EPO, 14 pages.

* cited by examiner

*Primary Examiner* — Graham P Smith
(74) *Attorney, Agent, or Firm* — Shankar Krithivasan

(57) ABSTRACT

Certain aspects of the present disclosure provide techniques for the mitigation of antenna panel misalignment. One aspect provides a method for wireless communication by an apparatus comprising a plurality of panels, wherein the plurality of panels comprise at least a first panel and a second panel. The method generally includes sending one or more signals from a first subset of a plurality of antenna elements associated with the plurality of panels; receiving the one or more signals on a second subset of the plurality of antenna elements; and determining an angle of misalignment between the first panel and the second panel based on one or more signal characteristics of the one or more received signals.

20 Claims, 10 Drawing Sheets

MITIGATION OF ANTENNA PANEL MISALIGNMENT

INTRODUCTION

Field of the Disclosure

Aspects of the present disclosure relate to wireless communications, and more particularly, to techniques for the mitigation of antenna panel misalignment.

DESCRIPTION OF RELATED ART

Wireless communications systems are widely deployed to provide various telecommunication services such as telephony, video, data, messaging, broadcasts, etc. These wireless communications systems may employ multiple-access technologies capable of supporting communications with multiple users by sharing available wireless communications system resources with those users. Wireless communication devices may communicate RF signals via any of various suitable radio access technologies (RATs) including, but not limited to, 5G New Radio (NR), Evolved Universal Terrestrial Radio Access (E-UTRA), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., Institute of Electrical and Electronics Engineers (IEEE) 802.11 specifications), any future RAT, and/or the like.

In certain cases, a wireless communications device is equipped with a radio frequency (RF) transceiver (also referred to as an RF front-end) for communicating RF signals. In general, a baseband signal is modulated to convey information using a modulation technique, such as phase-shift keying (PSK) or any other suitable modulation technique. In a transmit mode, the RF transceiver is responsible for multiplexing the baseband signal with an RF carrier signal that is transmitted over the air (e.g., a wireless communication channel). Such an operation is called upconversion. In a receive mode, the RF transceiver converts a received RF signal to the baseband signal. Such an operation is called downconversion. The received baseband signal then can be demodulated into the information encoded at a transmitter. The RF transceiver may include a cascade of components in a transmit chain and a receive chain, respectively. The cascade of components may include, for example, one or more of attenuators, switches, couplers, filters, mixers, amplifiers, frequency synthesizers, oscillators, antenna tuners, duplexers, diplexers, detectors, etc.

SUMMARY

Customer premises equipment (CPE) refers to any equipment and/or device deployed at a user's premises (e.g., home, business, etc.) to connect one or more devices, e.g., the user's local area network (LAN), to another one or more devices, such as a network entity of a broadband internet service. For example, a CPE may act as a gateway between a user's device(s) and an internet service provider's (ISP's) network, thereby enabling the user's devices to access and/or connect to the network. A CPE may be responsible for managing and controlling the flow of data between the user's device(s) and the ISP's network, helping to provide smooth and seamless internet connectivity. CPE may encompass a range of devices including, but not limited to, telephone handsets, modems, and routers.

Phased antenna arrays are often used in CPEs to transmit and receive communication signals (e.g., radio signals) over beamformed transmissions. As used herein, a phased antenna array (simply referred to herein as an "antenna array") is a collection of antenna elements (e.g., commonly organized in an array of rows and columns) that may be used for transmission and/or reception of radio signals. When the antenna array is used for transmission, each antenna element of the antenna array may be configured to tune the phase shift of a radio signal for transmissions and/or receptions. The phase difference between the radiated signals from each antenna element in the antenna array may allow the antenna array to perform beam steering to focus radio signals in a particular direction (e.g., direct signal power towards a receiver), thereby allowing for more efficient communication and higher data rates. For example, a particular beam weight, which may be defined in a codebook (e.g., which may be stored in a radio-frequency integrated circuit (RFIC) chip memory), may be applied to each antenna element of the antenna array to cause each antenna element to modify a radio signal with a particular phase shift. Similarly, when the antenna array is used for reception, each antenna element may be configured to apply a particular phase shift to increase the received signal power of a radio signal intended for the CPE. The codebook including the beam weights may be a beamforming codebook and/or a hybrid beamforming codebook.

Combining several antenna elements into an antenna array may yield higher array gain and interference suppression than a single antenna element. Array gain is defined as an improvement in the signal-to-noise ratio (SNR) obtained for an antenna array output compared to that for a single antenna element. In general, the performance of an antenna array may increase as the size of the antenna array and/or the number of antenna elements in the antenna array increases. From at least a cost savings perspective, however, some markets have recently seen a shift towards the use of CPEs with smaller antenna arrays. That is, the focus has shifted to manufacturing and deploying CPEs with smaller antenna arrays to allow for increased cost savings, even at the expense of CPE performance.

In certain aspects, to compensate for such performance loss, a CPE may be designed to include a mechanical displacement apparatus and multiple small size antenna arrays, where each small size antenna array may be referred to as an antenna panel (simply referred to herein as a "panel"). In certain aspects, the mechanical displacement apparatus may be a motor. In certain aspects, the mechanical displacement apparatus may be configured to mechanically displace one or more of the panels. The displacement may be linear (e.g., along an x-axis, a y-axis, or both) and/or angular (e.g., rotation from a first orientation or location to a second orientation or location). In certain aspects, other mechanical displacement may be possible (e.g., such as along a z-axis). For example, in certain aspects, the mechanical displacement apparatus may be used to displace one or more of the panels such that at least two panels of the CPE become co-located (e.g., at least two panels placed in close proximity to one another), thereby, in essence, creating a large size antenna array (e.g., two co-located 4×8 panels may be used to essentially create an 8×8 antenna array). The co-located panels may be co-phased to better focus radio signals in a particular direction, or put differently, better direct signal power towards a receiver for improved communications. As another example, in certain other aspects, the mechanical displacement apparatus may be used to displace (e.g., mechanically rotate) at least a first panel away from a second panel such that the two panels become non-co-located. In this case, the two panels may be used to communicate with multiple nodes. Further, displacement of the first panel may enable the CPE to receive/capture a reflected signal at an angle different from an angle of a radio signal that may be received at the second panel.

In certain aspects, a CPE may suffer from misalignments(s) emanating from the mechanical displacement of one or more panels of the CPE (e.g., via a mechanical displacement apparatus). For example, substantial misalignment between panels may result from the mechanical movement of panel(s) of the CPE. As used herein, a misalignment may refer to the incorrect arrangement, location, and/or orientation of a second panel in relation to a first panel. Antenna panel misalignment (simply referred to herein as "panel misalignment") may lead to random beamforming errors given the relative mechanical changes across panels may be random. Penal misalignment inevitably degrades beam steering performance of a CPE and thus limits the full potential of a CPE deployed in a wireless communications system to communicate data between a user's device(s) and an ISP's network. For example, a particular beam weight may be applied to each antenna element of two panels (which, together create a large size antenna array) to cause the panels to produce a radio signal with a particular direction for transmission. A codebook may include the beam weights that are used to configure each antenna element to tune the phase of the radio signal. The beam weights included in the codebook may assume that perfect alignment is achieved between the antenna panels; however, panel misalignment may be inevitable. Even small misalignment (e.g., such as 1 millimeter (mm) or 1.2 mm misalignment) between the panels may alter the direction of a radio signal, especially for mmWave frequencies. As such, a radio signal transmitted by the CPE (e.g., including the two antenna panels) towards a receiver may cause the radio signal to be received at the receiver with a lower signal quality than expected. Array gain and EIRP may also be reduced. Thus, the use of codebooks generated based on the assumption of perfect panel alignment in misaligned scenarios (e.g., where panel misalignment exists) may lead to a significant loss in communication performance.

Certain aspects described herein overcome the aforementioned technical problems associated with the use of smaller panels in CPEs (e.g., for cost efficient CPE design) and provide a technical benefit to the field of telecommunications. For example, aspects described herein provide techniques for the mitigation of panel misalignment. In certain aspects, the techniques may be used to mitigate panel misalignment in CPEs to improve beam steering capability of the CPE, or more specifically, better focus radio signals in a particular direction (e.g., towards a receiver).

As described herein, panel misalignment mitigation may include steps for (1) determining an angle of misalignment between two panels (e.g., which may be caused by mechanical displacement of one or more of the panels); and, in some cases, (2) modifying a codebook based at least in part on the angle of misalignment. More specifically, in certain aspects, the codebook may be modified for joint communications across the misaligned panels to compensate for the misalignment between the panels.

Some aspects provide a method for wireless communication by an apparatus comprising a plurality of panels, wherein the plurality of panels comprise at least a first panel and a second panel. The method includes sending one or more signals from a first subset of a plurality of antenna elements associated with the plurality of panels; receiving the one or more signals on a second subset of the plurality of antenna elements; and determining an angle of misalignment between the first panel and the second panel based on one or more signal characteristics of the one or more received signals.

Other aspects provide: an apparatus operable, configured, or otherwise adapted to perform any one or more of the aforementioned methods and/or those described elsewhere herein; a non-transitory, computer-readable medium comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Figure 1:
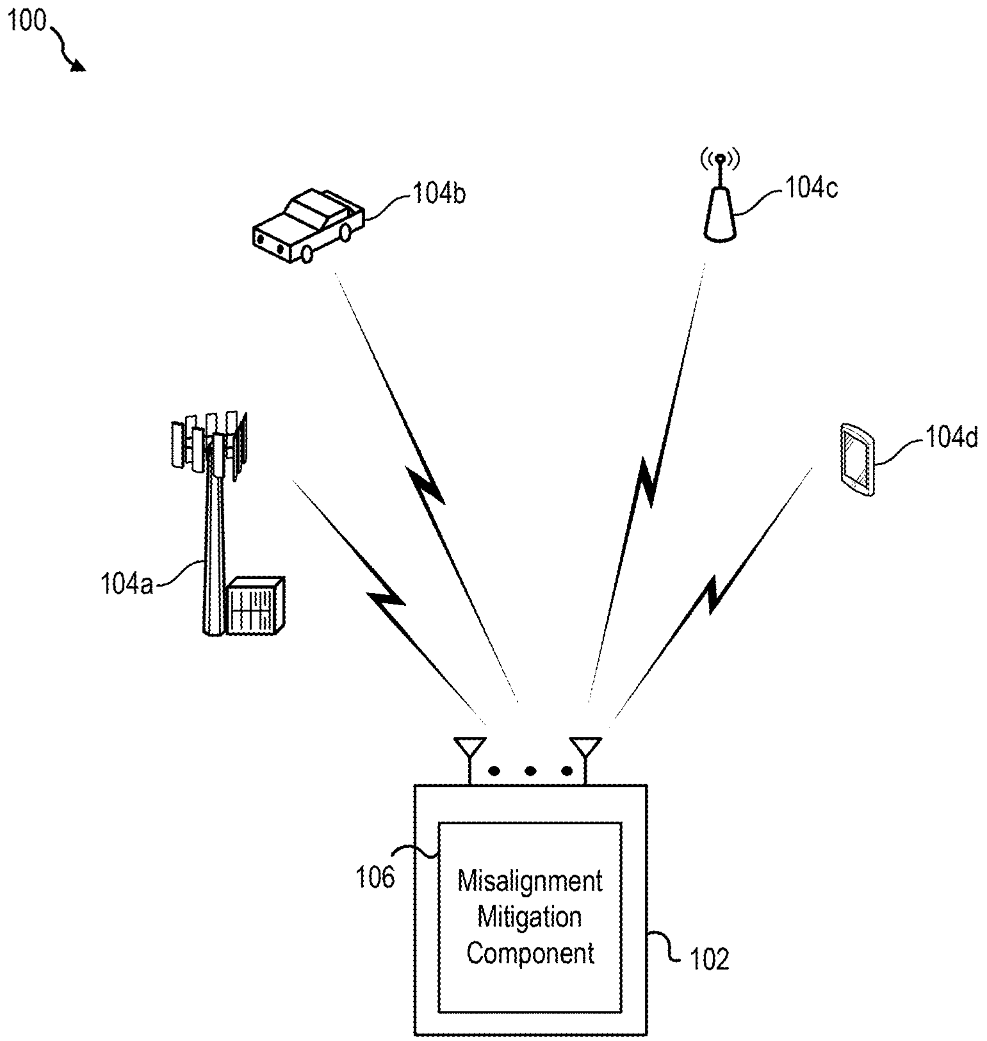
FIG. 1 depicts an example wireless communications system.

Aspects of the present disclosure provide apparatus, methods, processing systems, and computer-readable mediums for the mitigation of antenna panel misalignment, such as for customer premises equipment (CPE). Antenna panel misalignment mitigation may include steps for determining a degree of misalignment between antenna panels of a CPE, and, in some cases, performing a codebook update to compensate for the misalignment, such as where necessary. Antenna panel misalignment may result from the mechanical displacement of antenna panels for mechanical adjustment of the panels, followed by electrical beam steering of the adjusted panels (e.g., a technique that is used to steer a radiated beam of energy from one or more phased antenna panels). Though certain aspects are described with respect to CPEs, the techniques discussed herein may be similarly applicable to other devices, such as other millimeter wave (mmWave) devices, with mechanically displaced antenna panel(s). In certain aspects, the other devices may include wearables with changing form factors over time, where mechanical displacement of at least a part of the device relative to another part of the device is possible over time.

CPE refers to any equipment and/or device deployed at a user's premises (e.g., home, business, etc.) to connect one or more devices, e.g., the user's local area network (LAN), to another one or more devices, such as a network entity of a broadband internet service. For example, a CPE may act as a gateway between a user's device(s) and an internet service provider's (ISP's) network, thereby enabling the user's devices to access and/or connect to the network. A CPE may be responsible for managing and controlling the flow of data between the user's device(s) and the ISP's network, helping to provide smooth and seamless internet connectivity. CPE may encompass a range of devices including, but not limited to, telephone handsets, modems, and routers.

A 5G CPE is one example type of CPE that utilizes 5G cellular technology to provide internet connectivity. A 5G CPE may act as a bridge between a 5G mobile network and a user's device(s), such as mobile phone(s), tablet(s), and/or laptop(s), without requiring a built-in 5G chipset. 5G CPE may operate in sub-6 gigahertz (GHz) and mmWave frequency bands, ensuring adaptability to various 5G network bands and environments. Other example CPEs may similarly connect user devices to other generations of wireless technologies (e.g., such as 6G).

Phased antenna arrays are often used in CPEs to transmit and receive communication signals (e.g., radio signals) over beamformed transmissions. As used herein, a phased antenna array (simply referred to herein as an "antenna array") is a collection of antenna elements (e.g., commonly organized in an array of rows and columns) that may be used for transmission and/or reception of radio signals. When the antenna array is used for transmission, each antenna element of the antenna array may be configured to tune the phase shift of a radio signal for transmissions and/or receptions. The phase difference between the radiated signals from each antenna element in the antenna array may allow the antenna array to perform beam steering to focus radio signals in a particular direction (e.g., direct signal power towards a receiver), thereby allowing for more efficient communication and higher data rates. For example, a particular beam weight, which may be defined in a codebook (e.g., which may be stored in a radio-frequency integrated circuit (RFIC) chip memory), may be applied to each antenna element of the antenna array to cause each antenna element to modify a radio signal with a particular phase shift. Similarly, when the antenna array is used for reception, each antenna element may be configured to apply a particular phase shift to increase the received signal power of a radio signal intended for the CPE. The codebook including the beam weights may be a beamforming codebook and/or a hybrid beamforming codebook.

Combining several antenna elements into an antenna array may yield higher array gain and interference suppression than a single antenna element. Array gain is defined as an improvement in the signal-to-noise ratio (SNR) obtained for an antenna array output compared to that for a single antenna element. In general, the performance of an antenna array may increase as the size of the antenna array and/or the number of antenna elements in the antenna array increases. For example, a large size antenna array (e.g., an 8×8 antenna array, a 16×8 antenna array, a 16×16 antenna array, etc.), with a large number of antenna elements, may offer higher array gain and a more directional radiation pattern (e.g., making it more suitable for long-distance communication) than a small size antenna array (e.g., a 2×4 antenna array, a 4×4 antenna array, etc.), although at the expense of increased cost, power consumption, and complexity.

From at least a cost savings perspective, some markets have recently seen a shift towards the use of CPEs with smaller antenna arrays. That is, the focus has shifted to manufacturing and deploying CPEs with smaller antenna arrays to allow for increased cost savings, even at the expense of CPE performance. For example, smaller antenna arrays, having a fewer number of antenna elements, may achieve less array gain and further, equivalent/effective isotropic radiated power (EIRP) loss relative to the use of a large array, where EIRP is a measure of the total radiated power from a transmitter (e.g., the antenna array) times the numerical directivity of a radio signal in the direction of a receiver, or the power delivered to an antenna array times the antenna array gain. Communication coverage may also be reduced with the use of smaller antenna arrays.

Figure 3:
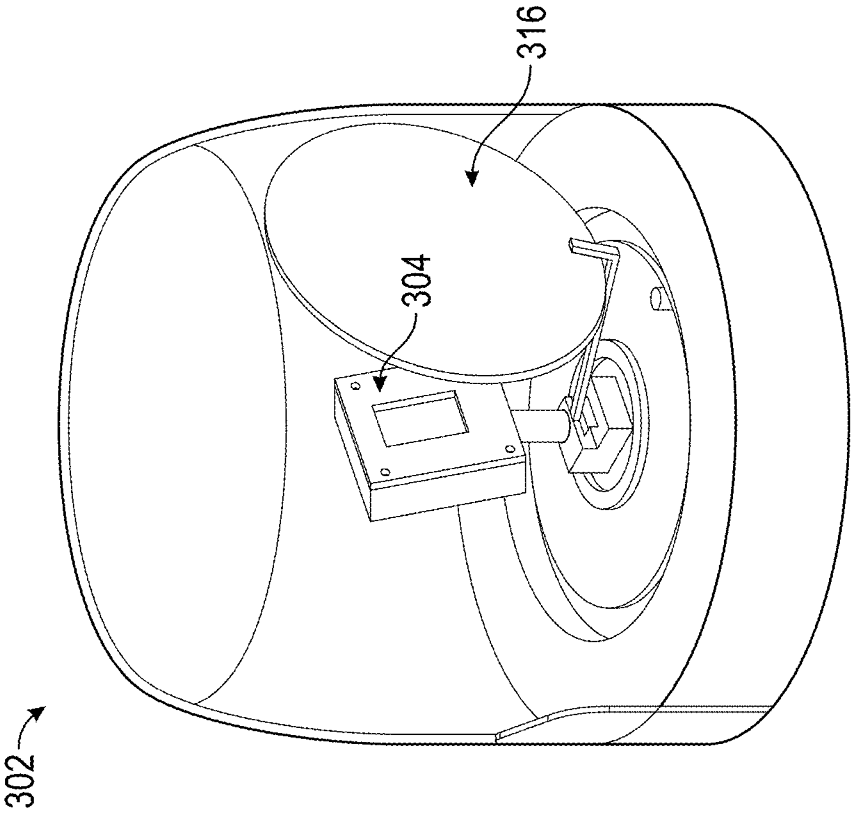
FIG. 3 depicts an example consumer premises equipment (CPE) design including a reflector.

In certain aspects, to compensate for such performance loss, a CPE (e.g., with a smaller antenna array) may be designed to additionally include a reflector. For example, as shown in FIG. 3, a CPE 302 may be manufactured to include a small size antenna array 304 (e.g., a 2×4 antenna array, a 4×4 antenna array, etc.) and a reflector 316. Reflector 316 may be used to change the direction of radio signals by reflection, to focus the radio signals from antenna array 304, e.g., a low gain antenna array, into a beam. In some cases, reflector 316 may be a Cassegrain reflector.

In certain aspects, to compensate for such performance loss, a CPE may be designed to include a mechanical displacement apparatus and multiple small size antenna arrays, where each small size antenna array may be referred to as an antenna panel (simply referred to herein as a "panel"). In certain aspects, the mechanical displacement apparatus may be a motor. In certain aspects, the mechanical displacement apparatus may be configured to mechanically displace one or more of the panels. The displacement may be linear (e.g., along an x-axis, a y-axis, or both) and/or angular (e.g., rotation from a first orientation or location to a second orientation or location). In certain aspects, other mechanical displacement may be possible (e.g., such as along a z-axis).

For example, in certain aspects, the mechanical displacement apparatus may be used to displace one or more of the panels such that at least two panels of the CPE become co-located (e.g., at least two panels placed in close proximity to one another), thereby, in essence, creating a large size antenna array (e.g., two co-located 4×8 panels may be used to essentially create an 8×8 antenna array). The co-located panels may be co-phased to better focus radio signals in a particular direction, or put differently, better direct signal power towards a receiver for improved communications.

As another example, in certain other aspects, the mechanical displacement apparatus may be used to displace (e.g., mechanically rotate) at least a first panel away from a second panel such that the two panels become non-co-located. In this case, the two panels may be used to communicate with multiple nodes. Further, displacement of the first panel may enable the CPE to receive/capture a reflected signal at an angle different from an angle of a radio signal that may be received at the second panel.

Accordingly, the mechanical displacement apparatus may be used to mechanically displace panel(s) for (1) beam steering and/or (2) the reception of radio signals, at the CPE, at different angles. It is noted that the above-described displacement enabled by the mechanical displacement apparatus is not an exhaustive list, and other types of displacement may be possible for panel(s) of the CPE.

In certain aspects, a CPE may suffer from misalignments(s) emanating from the mechanical displacement of one or more panels of the CPE (e.g., via a mechanical displacement apparatus). For example, substantial misalignment between panels may result from the mechanical movement of panel(s) of the CPE. As used herein, a misalignment may refer to the incorrect arrangement, location, and/or orientation of a second panel in relation to a first panel. Example misalignment between a first panel and a second panel may include linear misalignment, which may include deviations, along the x-axis and/or the y-axis, from an intended/correct location/alignment of the first panel and/or the second panel. Example misalignment may also include angular misalignment, where the centerlines of the first panel and the second panel intersect at an angle different than what is expected. Linear misalignment and angular misalignment are depicted and described below with respect to FIG. 5. Antenna panel misalignment (simply referred to herein as "panel misalignment") may lead to random beamforming errors given the relative mechanical changes across panels may be random.

Panel misalignment inevitably degrades beam steering performance of a CPE and thus limits the full potential of a CPE deployed in a wireless communications system to communicate data between a user's device(s) and an ISP's network. For example, a particular beam weight may be applied to each antenna element of two panels (which, together create a large size antenna array) to cause the panels to produce a radio signal with a particular direction for transmission. A codebook may include the beam weights that are used to configure each antenna element to tune the phase of the radio signal. The beam weights included in the codebook may assume that perfect alignment is achieved between the antenna panels; however, panel misalignment may be inevitable. Even small misalignment (e.g., such as 1 millimeter (mm) or 1.2 mm misalignment) between the panels may alter the direction of a radio signal, especially for mmWave frequencies. As such, a radio signal transmitted by the CPE (e.g., including the two antenna panels) towards a receiver may cause the radio signal to be received at the receiver with a lower signal quality than expected. Array gain and EIRP may also be reduced. Thus, the use of codebooks generated based on the assumption of perfect panel alignment in misaligned scenarios (e.g., where panel misalignment exists) may lead to a significant loss in communication performance.

Certain aspects described herein overcome the aforementioned technical problems associated with the use of smaller panels in CPEs (e.g., for cost efficient CPE design) and provide a technical benefit to the field of telecommunications. For example, aspects described herein provide techniques for the mitigation of panel misalignment. In certain aspects, the techniques may be used to mitigate panel misalignment in CPEs to improve beam steering capability of the CPE, or more specifically, better focus radio signals in a particular direction (e.g., towards a receiver).

As described herein, panel misalignment mitigation may include steps for (1) determining an angle of misalignment between two panels (e.g., which may be caused by mechanical displacement of one or more of the panels); and, in some cases, (2) modifying a codebook based at least in part on the angle of misalignment. More specifically, in certain aspects, the codebook may be modified for joint communications across the misaligned panels to compensate for the misalignment between the panels.

In certain aspects, modification of the codebook may be based on whether the angle of misalignment satisfies a (configured) threshold angle of misalignment. For example, if the angle of misalignment between the panels does not satisfy a threshold angle of misalignment (e.g., angle of misalignment<threshold angle of misalignment), then the loss in performance when using a pre-existing codebook (e.g., designed for ideal/aligned conditions and which may be stored in an RFIC chip memory) may be minimal. As such, existing beam weights associated with the codebook may continue to be used. Alternatively, if the angle of misalignment between the panels does satisfy the threshold angle of misalignment (e.g., angle of misalignment≥threshold angle of misalignment), then the loss in performance when using a pre-existing codebook (e.g., designed for ideal/aligned conditions) may be significant and/or may be mitigated with codebook adjustment operations. As such, the angle of misalignment may be used in an algorithm for a codebook redesign (e.g., to update beam weights associated with one or more antenna elements). For example, in an algorithm, the relative angle of a first panel with respect to a second panel may be used to update beam weight(s) to enable the steering of beam(s) towards a common direction.

As described herein, various methods may be used to determine the angle of misalignment between panels, such as to determine whether a codebook update is warranted. A first illustrative method may include a self-calibration method, where a first panel of the CPE sends a beamformed signal. A second panel of the CPE may receive the beamformed signal and determine an angle of misalignment between the panels based on signal characteristic(s), such as an observed signal strength, of the received beamformed signal. A second illustrative method may utilize round-trip time (RTT) measurements from transmissions and receptions of beamformed signals (e.g., self-calibration signals) (1) between a first group of antenna elements and a second group of antenna elements on a first panel and (2) between a third group of antenna elements and a fourth group of antenna elements on a second panel. An RTT measurement may refer to the time it takes for a packet to go from a sending node to a receiving node and back. For example, the RTT measurements may be used to determine an angle of misalignment between the panels. A third illustrative method may determine an angle of misalignment between panels of a CPE based on sensor data indicating a location and/or orientation of one or more of the panels.

The techniques for panel misalignment mitigation as described herein may provide various beneficial effects and/or advantages. For example, the techniques for panel misalignment mitigation may enable improved wireless communication performance, such as improved wireless coverage, higher data rates, and more efficient communication. The improved wireless communication performance may be attributable to the use of a re-designed codebook (e.g., updated based on a determined angle of misalignment) that allows for higher array gain and a more directional radiation pattern of a radio signal from a low cost CPE with misaligned panels.

Example Wireless Communications System

FIG. 1 illustrates an example wireless communications system 100 in which aspects of the present disclosure may be performed. For example, the wireless communications system 100 may include a wireless wide area network (WWAN) and/or a wireless local area network (WLAN). A WWAN may include a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation (2G) or Third Generation (3G) network), a code division multiple access (CDMA) system (e.g., a 2G/3G network), any future WWAN system, or any combination thereof. A WLAN may include a wireless network configured for communications according to an Institute of Electrical and Electronics Engineers (IEEE) standard such as one or more of the 802.11 standards, etc. In some cases, the wireless communications system 100 may include a device-to-device (D2D) communications network or a short-range communications system, such as Bluetooth communications or near field communications (NFC).

As illustrated in FIG. 1, the wireless communications system 100 may include a first wireless device 102 communicating with any of various second wireless devices 104*a-d* (hereinafter "the second wireless device 104") via any of various radio access technologies (RATs), where a wireless device may refer to a wireless communications device. The RATs may include, for example, WWAN communications (e.g., E-UTRA and/or 5G NR), WLAN communications (e.g., IEEE 802.11), vehicle-to-everything (V2X) communications, non-terrestrial network (NTN) communications, short-range communications (e.g., Bluetooth), etc.

The first wireless device 102 may include any of various wireless communications devices including a user equipment (UE), a base station, a wireless station, an access point, customer-premises equipment (CPE), etc. In certain aspects, the first wireless device 102 includes a misalignment mitigation component 106 that determines a degree of misalignment between panels of a CPE, and, in certain aspects, performs a codebook update to compensate for the misalignment, such as where necessary, in accordance with aspects of the present disclosure.

The second wireless device 104 may include, for example, abase station 104*a*, a vehicle 104*b*, an access point (AP) 104*c*, and/or a UE 104*d*. Further, the wireless communications systems 100 may include terrestrial aspects, such as ground-based network entities (e.g., the base station 104*a* and/or access point 104*c*), and/or non-terrestrial aspects, such as a spaceborne platform and/or an aerial platform, which may include network entities on-board (e.g., one or more base stations) capable of communicating with other network elements (e.g., terrestrial base stations) and/or user equipment.

The base station 104*a* may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. The base station 104*a* may provide communications coverage for a respective geographic coverage area, which may sometimes be referred to as a cell, and which may overlap in some cases (e.g., a small cell may have a coverage area that overlaps the coverage area of a macro cell). A base station may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

The first wireless device 102 and/or the UE 104*d* may generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. A UE may also be referred to more generally as a mobile device, a wireless device, a wireless communications device, a wireless station (STA), a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and other terms.

Figure 2:
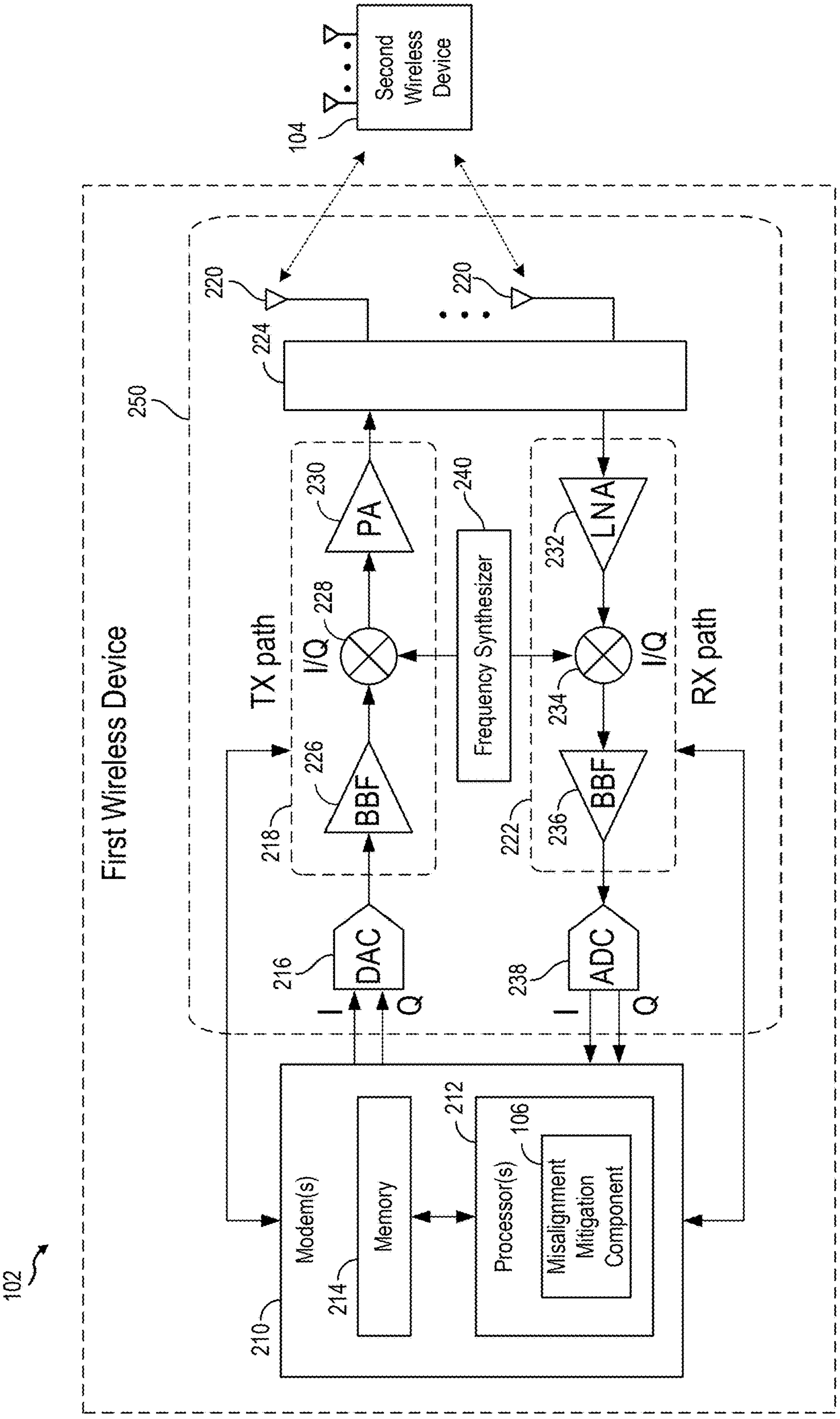
FIG. 2 depicts an example wireless communications device communicating with another device.

FIG. 2 illustrates example components of the first wireless device 102, which may be used to communicate with any of the second wireless devices 104.

The first wireless device 102 may be, or may include, a chip, system on chip (SoC), system in package (SiP), chipset, package, device that includes one or more modems 210 (hereinafter "the modem 210"). In some cases, the modem 210 may include, for example, any of a WWAN modem (e.g., a modem configured to communicate via E-UTRA 5G NR, and/or any future WWAN communications standards), a WLAN modem (e.g., a modem configured to communicate via IEEE 802.11 standards), a Bluetooth modem, a NTN modem, etc. In certain aspects, the first wireless device 102 also includes one or more RF transceivers (hereinafter "the RF transceiver 250"). In some cases, the RF transceiver 250 may be referred to as an RF front end (RFFE). In some aspects, the modem 210 further includes one or more processors, processing blocks or processing elements (hereinafter "the processor 212") and one or more memory blocks or elements (hereinafter "the memory 214"). In some cases, the processor 212 may implement and/or include the misalignment mitigation component 106. In certain aspects, the processor 212 and/or the memory 214 are implemented external or otherwise separate from the modem 210.

In certain aspects, the processor 212 may process any of certain protocol stack layers associated with a radio access technology (RAT). For example, the processor 212 may process any of an application layer, packet layer, WLAN protocol stack layers (e.g., a link or a medium access control (MAC) layer), and/or WWAN protocol stack layers (e.g., a radio resource control (RRC) layer, a packet data convergence protocol (PDCP) layer, a radio link control (RLC) layer, and a MAC layer).

The modem 210 may generally be configured to implement a physical (PHY) layer. For example, the modem 210 may be configured to modulate packets and to output the modulated packets to the RF transceiver 250 for transmission over a wireless medium. The modem 210 is similarly configured to obtain modulated packets received by the RF transceiver 250 and to demodulate the packets to provide demodulated packets. In addition to a modulator and a demodulator, the modem 210 may further include digital signal processing (DSP) circuitry, automatic gain control (AGC), a coder, a decoder, a multiplexer, and/or a demultiplexer (not shown).

As an example, while in a transmission mode, the modem 210 may obtain data from a data source, such as an application processor. The data may be provided to a coder, which encodes the data to provide encoded bits. The encoded bits may be mapped to points in a modulation constellation (e.g., using a selected modulation and coding scheme) to provide modulated symbols. The modulated symbols may be mapped, for example, to spatial stream(s) or space-time streams. The modulated symbols may be multiplexed, transformed via an inverse fast Fourier transform (IFFT) block, and subsequently provided to DSP circuitry for transmit windowing and filtering. The digital signals may be provided to a digital-to-analog converter (DAC) 216. In certain aspects involving beamforming, the modulated symbols in the respective spatial streams may be precoded via a steering matrix prior to provision to the IFFT block.

The modem 210 may be coupled to the RF transceiver 250 by a transmit (TX) path 218 (also known as a transmit chain) for transmitting signals via one or more antennas 220 (hereinafter "the antennas 220") and a receive (RX) path 222 (also known as a receive chain) for receiving signals via the antennas 220. When the TX path 218 and the RX path 222 share the antennas 220, the paths may be coupled to the antennas 220 via an interface 224, which may include any of various suitable RF devices, such as a balun, a transformer, an antenna tuner, a switch, a duplexer, a diplexer, a multiplexer, and the like. As an example, the modem 210 may output digital in-phase (I) and/or quadrature (Q) baseband signals representative of the respective symbols to the DAC 216. In some examples, all or most of the elements illustrated as being included in the RF transceiver 250 are implemented in a single chip or die. For example, in some configurations, all of the elements of the RF transceiver except the antennas 220 are implemented on a single chip. In some other configurations, the interface 224 or a portion thereof is also omitted from the single chip.

Receiving I or Q baseband analog signals from the DAC 216, the TX path 218 may include a baseband filter (BBF) 226, a mixer 228 (which may include one or several mixers), and a power amplifier (PA) 230. The BBF 226 filters the baseband signals received from the DAC 216, and the mixer 227 mixes the filtered baseband signals with a transmit local oscillator (LO) signal to convert the baseband signal to a different frequency (e.g., upconvert from baseband to a radio frequency). In some aspects, the frequency conversion process produces the sum and difference frequencies between the LO frequency and the frequencies of the baseband signal. The sum and difference frequencies are referred to as the beat frequencies. Some beat frequencies are in the RF range, such that the signals output by the mixer 228 are typically RF signals, which may be amplified by the PA 230 before transmission by the antennas 220. The antennas 220 may emit RF signals, which may be received at the second wireless device 104. While one mixer 228 is illustrated, several mixers may be used to upconvert the filtered baseband signals to one or more intermediate frequencies and to thereafter upconvert the intermediate frequency signals to a frequency for transmission.

The RX path 222 may include a low noise amplifier (LNA) 232, a mixer 234 (which may include one or several mixers), and a baseband filter (BBF) 236. RF signals received via the antennas 220 (e.g., from the second wireless device 104) may be amplified by the LNA 232, and the mixer 234 mixes the amplified RF signals with a receive local oscillator (LO) signal to convert the RF signal to a baseband frequency (e.g., downconvert). The baseband signals output by the mixer 234 may be filtered by the BBF 236 before being converted by an analog-to-digital converter (ADC) 238 to digital I or Q signals for digital signal processing. The modem 210 may receive the digital I or Q signals and further process the digital signals, for example, demodulating the digital signals into information.

Certain transceivers may employ frequency synthesizers with a voltage-controlled oscillator (VCO) to generate a stable, tunable LO frequency with a particular tuning range. Thus, the transmit LO frequency may be produced by a frequency synthesizer 240, which may be buffered or amplified by an amplifier (not shown) before being mixed with the baseband signals in the mixer 228. Similarly, the receive LO frequency may be produced by the frequency synthesizer 240, which may be buffered or amplified by an amplifier (not shown) before being mixed with the RF signals in the mixer 234. Separate frequency synthesizers may be used for the TX path 218 and the RX path 222.

While in a reception mode, the modem 210 may obtain digitally converted signals via the ADC 238 and RX path 222. As an example, in the modem 210, digital signals may be provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also may be coupled with the demodulator, which is configured to extract modulated symbols from the signal and, for example, compute the logarithm likelihood ratios (LLRs) for each bit position of each subcarrier in each spatial stream. The demodulator may be coupled with the decoder, which may be configured to process the LLRs to provide decoded bits. The decoded bits from all of the spatial streams may be fed to the demultiplexer for demultiplexing. The demultiplexed bits may be descrambled and provided to a medium access control layer (e.g., the processor 212) for processing, evaluation, or interpretation.

The modem 210 and/or processor 212 may control the transmission of signals via the TX path 218 and/or reception of signals via the RX path 222. In some aspects, the modem 210 and/or processor 212 may be configured to perform various operations, such as those associated with any of the methods described herein. The modem 210 and/or processor 212 may include a microcontroller, a microprocessor, an application processor, a baseband processor, a MAC processor, an artificial intelligence (AI) processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 214 may store data and program codes (e.g., processor-readable instructions) for performing wireless communications as described herein. In some cases, the memory 214 may be external to the modem 210 and/or processor 212 and/or incorporated therein (as illustrated with the memory 214 or being incorporated with the processor 212).

FIG. 2 shows an example transceiver design. It will be appreciated that other transceiver designs or architectures may be applied in connection with aspects of the present disclosure. For example, while examples discussed herein utilize I and Q signals (e.g., quadrature modulation), those of skill in the art will understand that components of the transceiver may be configured to utilize any other suitable modulation, such as polar modulation. As another example, circuit blocks may be arranged differently from the configuration shown in FIG. 2, and/or other circuit blocks not shown in FIG. 2 may be implemented in addition to or instead of the blocks depicted.

Example Antenna Panel Misalignment

As described herein, some CPEs are designed to include a mechanical displacement apparatus and multiple panels. The mechanical displacement apparatus may be configured to displace one or more of the panels of the CPE. That is, the mechanical displacement apparatus may be configured to rotate panel(s), move panel(s) along an x-axis (e.g., left to right), move panel(s) along a y-axis (e.g., up and down), etc. within a CPE. In certain aspects, mechanical displacement may be used to co-locate panels within a CPE to increase the power of a radiated signal towards a single node. In certain aspects, mechanical displacement may be used to displace co-located panels away from one another (e.g., such that the panels are not co-located) to increase communications coverage of the CPE.

Figure 4:
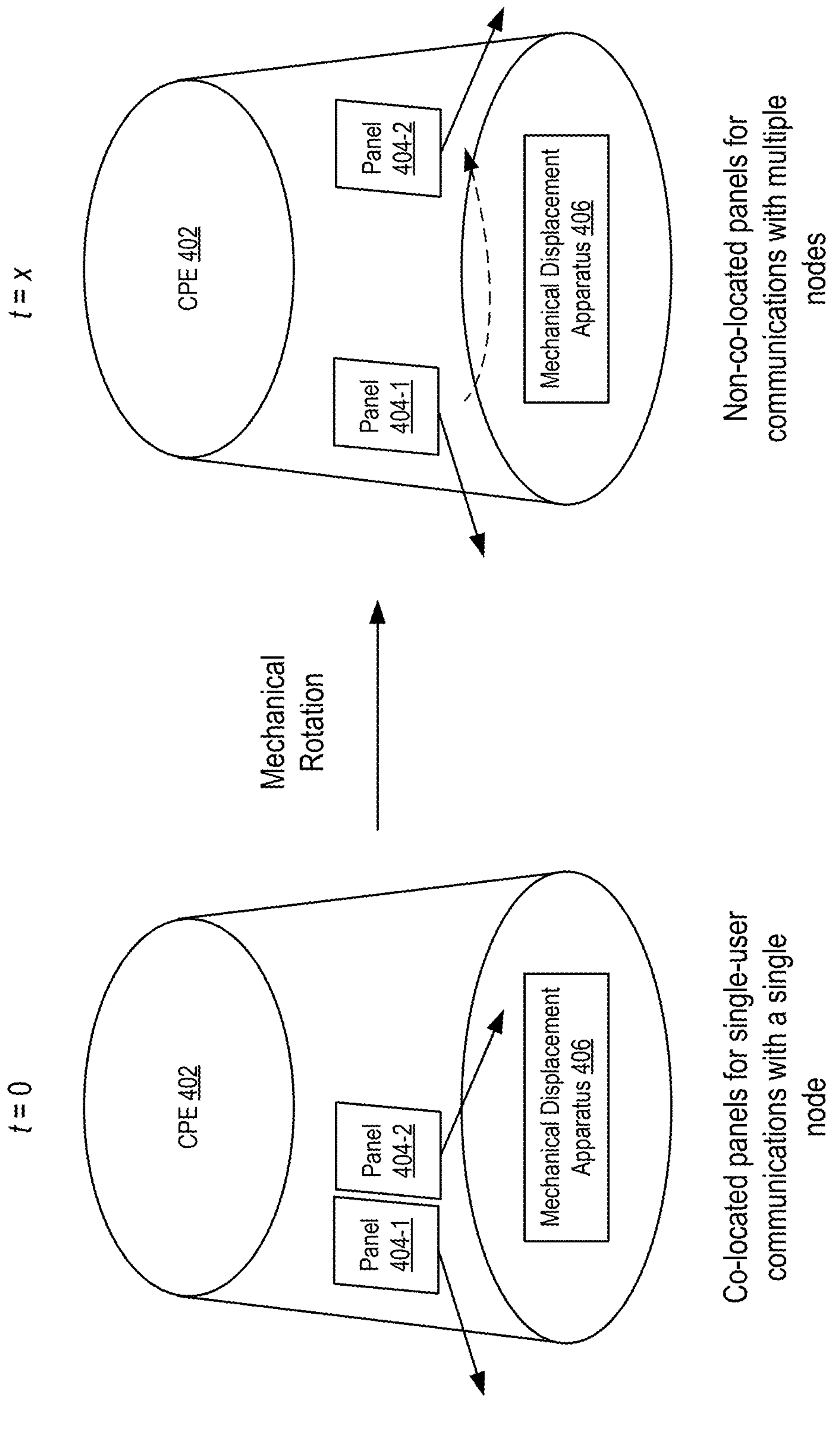
FIG. 4 depicts an example CPE design including a mechanical displacement apparatus.

FIG. 4 depicts an example CPE 402 including a mechanical displacement apparatus 406. CPE 402 further includes a panel 404-1 and a panel 404-2. Panel 404-1 and panel 404-2 may each be an example of a small size antenna array (e.g., 2×4 antenna array, 4×4 antenna array, etc.) including multiple antenna elements (not shown). In certain aspects, mechanical displacement apparatus 406 may be an example motor configured to displace panel 404-1 and/or panel 404-2.

Mechanical displacement apparatus 406 may be configured to displace panel 404-1, panel 404-2, or both. For example, at time t=0, panel 404-1 and panel 404-2 may be co-located to perform single-user communications with a single node. That is, panel 404-1 and panel 404-2 may be in close proximity to one another to transmit and/or receive radio signal(s) to/from a single node.

In this example, mechanical displacement apparatus 406 may rotate panel 404-2 from its original location in CPE 402 to a new location in CPE 402 such that panel 404-1 and panel 404-2 are no longer co-located at time t=x (e.g., where x is greater than zero). The orientation of panel 404-2 may also change based on the displacement caused by mechanical displacement apparatus 406. Mechanical displacement apparatus 406 may rotate panel 404-2 to enable CPE 402 to communicate with multiple nodes (instead of only one node, as shown at time t=0). For example, mechanical displacement apparatus 406 may rotate panel 404-2 to its new location and/or orientation in CPE 402 to enable panel 404-2 to receive a radio signal that may be reflected at a direction towards the new location and/or orientation of CPE 402. The reflected radio signal may be from a first node. Simultaneously, CPE 402 may use panel 404-1 to communicate with a second node.

In certain aspects, after time t=0, mechanical displacement apparatus 406 may be used to again re-co-locate panel 404-1 and panel 404-2, similar to their locations shown at time t=0, and/or displace panel 404-1 and/or panel 404-2 to a new location and/or with a new orientation in CPE 402 (e.g., linear and/or angular displacement). For example, mechanical displacement apparatus 406 may again co-locate panel 404-1 and panel 404-2 to perform co-phasing to better focus radio signal(s) in a particular direction.

In certain aspects, CPE 402 may suffer from misalignments(s) emanating from the mechanical displacement of panel 404-1 and/or panel 404-2 (e.g., via mechanical displacement apparatus 406).

Figure 5:
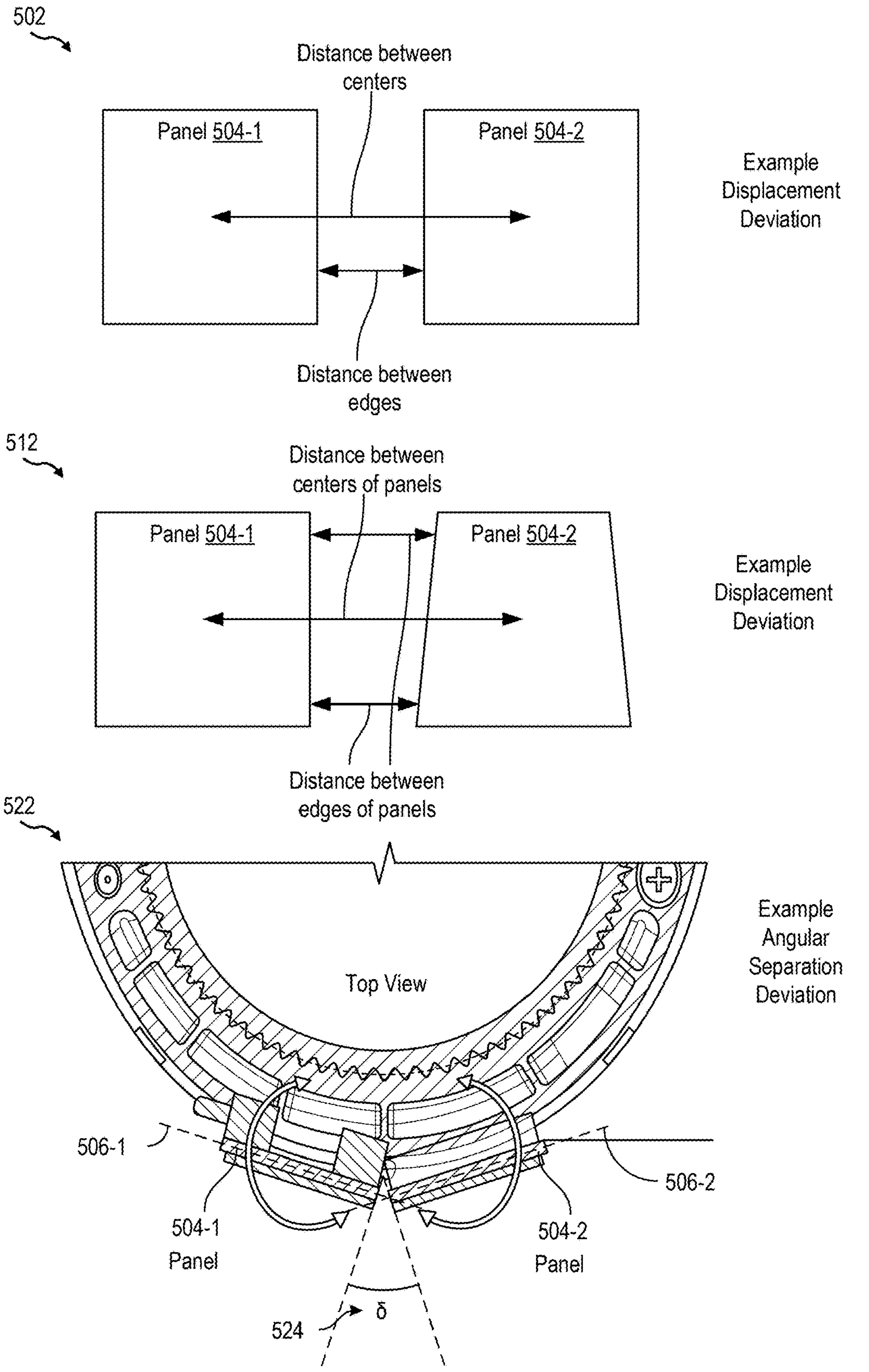
FIG. 5 depicts example antenna panel misalignment.

Example misalignments of panels in a CPE are depicted in FIG. 5.

A first illustrative misalignment, shown at 502, includes a linear misalignment between panels 504-1, 504-2 having a same geometry (e.g., a same rectangular shape and size). This linear misalignment between panels 504-1, 504-2 may occur when panel 504-1 and/or panel 504-2 is mechanically displaced to such that panels 504-1, 504-2 are at an expected distance from one another. Due to the use of a mechanical displacement apparatus (e.g., such as mechanical displacement apparatus 406 in FIG. 4), the actual distance between panel 504-1 and panel 504-2 (e.g., shown as the distance between edges of panel 504-1 and 504-2) may be different than the expected distance (e.g., may be a few millimeters different). This may also cause the distance between the centers of panels 504-1, 504-2 to be further apart or closer together than originally intended.

A second illustrative misalignment, shown at 512, includes a linear misalignment between panels 504-1, 504-2 having different geometry. For example, panel 504-1 may be a rectangle, and panel 504-1 may be a trapezoid. Due to geometrical differences (e.g., differences in shape) between panels 504-1, 504-2, the distance between the upper edge portion of panel 504-1 and the upper edge portion of panel 504-2 may be different than the distance between the bottom edge portion of panel 504-1 and the bottom edge portion of panel 504-2. The distance between the upper edge portion of panel 504-1 and the upper edge portion of panel 504-2 may be a greater distance than what is expected; thus, there may be misalignment between panel 504-1 and panel 504-1. In some cases, there may also be linear misalignment between the panel 504-1 and panel 504-2 based at least in part on the distance between the center of panel 504-1 and panel 504-2 being different than a distance expected to be between the center of panel 504-1 and panel 504-2.

A third illustrative misalignment, shown at 522, includes an angular misalignment between panels 504-1, 504-2. In particular, a centerline 506-1 of panel 504-1 may intersect a centerline 506-2 of panel 504-2 at an angle, δ (shown at 524). This angle, δ, may represent the angular misalignment between panels 504-1, 504-2 when panel 504-1 and/or panel 504-2 is mechanically displaced, such as within a CPE. Panels that are not misaligned (e.g., are misaligned) may each have corresponding centerlines that intersect at an expected angle with respect to one another. For example, in some cases, the panels may be expected to be parallel to one another (e.g., intersect at an angle of zero). Thus, the panels may be aligned when the centerline of each panel is parallel to one another.

It is noted that the above-described panel misalignments are not an exhaustive list, and other types of panel misalignments may be possible for antenna panels. Further, it is noted that one or more of the above-described misalignments may occur at a single point in time or over a period of time (e.g., two panels may have linear and angular misalignment at a point in time).

A codebook for a CPE may include information about beam weights to be applied to antenna elements of the CPE's panels. The beam weights may be determined assuming ideal conditions, such as no misalignment between the panels. Thus, in cases where misalignment between the panels (e.g., such as the misalignment shown at 502, 512, and/or 522 in FIG. 5) exists, the beam weights applied to the antenna elements may degrade beam steering performance of the CPE. For example, even small misalignment between the panels may alter the direction of a radio signal such that a signal quality of the radio signal observed at a receiver is lower than expected.

Thus, the use of codebooks generated based on the assumption of perfect panel alignment in misaligned scenarios (e.g., where panel misalignment exists) may lead to a significant loss in communication performance.

Aspects Related to Antenna Panel Misalignment Mitigation

Aspects of the present disclosure provide various methods that may be used to mitigate panel misalignment, such as for panels of CPEs (e.g., low cost CPEs). In certain aspects, the methods may be used to mitigate misalignment between two panels. For example, an angle of misalignment between a first panel and a second panel may be determined using one or more of the methods described herein. This angle of misalignment may be used to update a codebook associated with the CPE, and more specifically a codebook associated with the first panel and the second panel, to adjust one or more beam weights applied to the one or more antenna elements. The codebook including the beam weights may be a beamforming codebook and/or a hybrid beamforming codebook. Adjusting the beam weight(s) applied to the antenna element(s) may help to compensate for the misalignment and thus improve (1) the signal quality and/or directionality of a signal transmitted by the CPE and/or (2) the reception of a radio signal at the CPE.

In certain aspects, the angle of misalignment between two panels may be compared to a threshold angle of misalignment. An angle of misalignment that does not satisfy a threshold angle of misalignment (e.g., angle of misalignment<threshold angle of misalignment) may indicate that any performance loss incurred as a result of the misalignment may be minimal. As such, a current/pre-existing codebook (e.g., including the beam weights applied to antenna elements of the panels) may continue to be used. Alternatively, an angle of misalignment that does satisfy the threshold angle of misalignment (e.g., angle of misalignment≥threshold angle of misalignment) may indicate that performance loss, due to the misalignment, is significant. Thus, a codebook update may be warranted. The codebook update may be based at least on the determined angle of misalignment between the panels. This codebook update may help to mitigate the impact from panel misalignment (e.g., that may increase/get worse over time), which may be critical to maintain communication performance of the CPE.

Figure 6A:
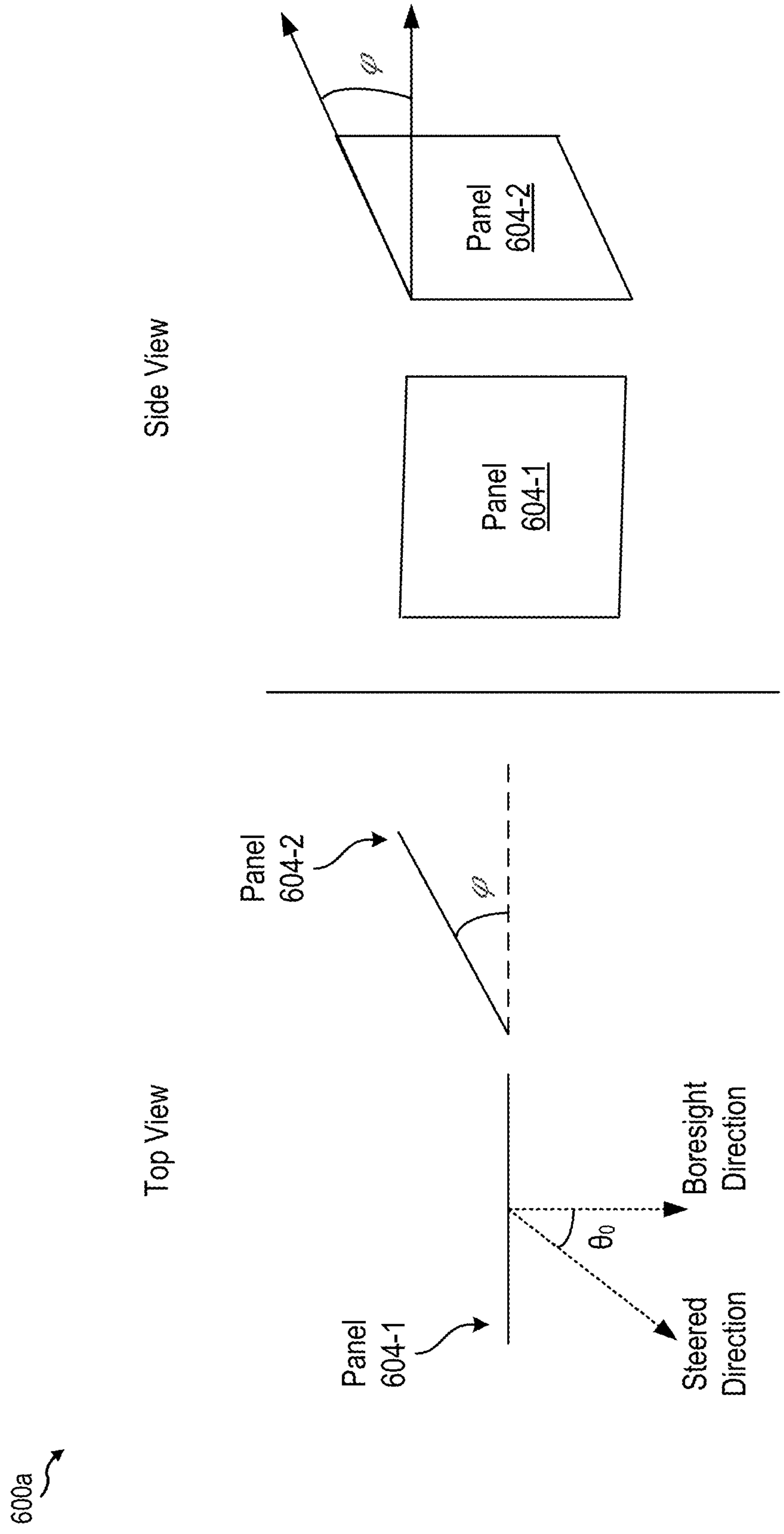
FIG. 6A depicts example misalignment between two antenna panels.
Figure 6B:
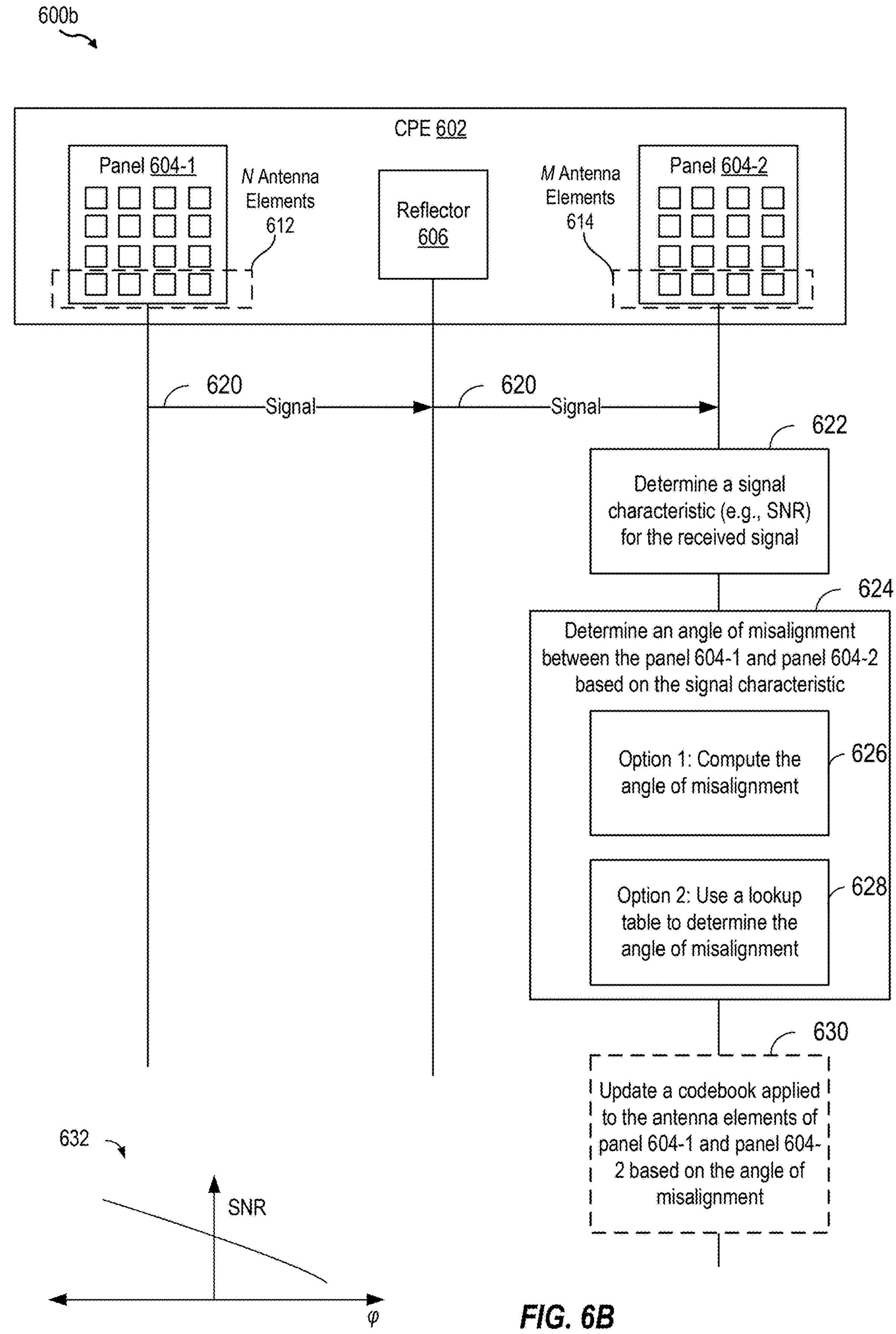
FIG. 6B depicts an example process flow for communications in a network between the two antenna panels depicted in FIG. 6A to determine an angle of misalignment between the two antenna panels.
Figure 6C:
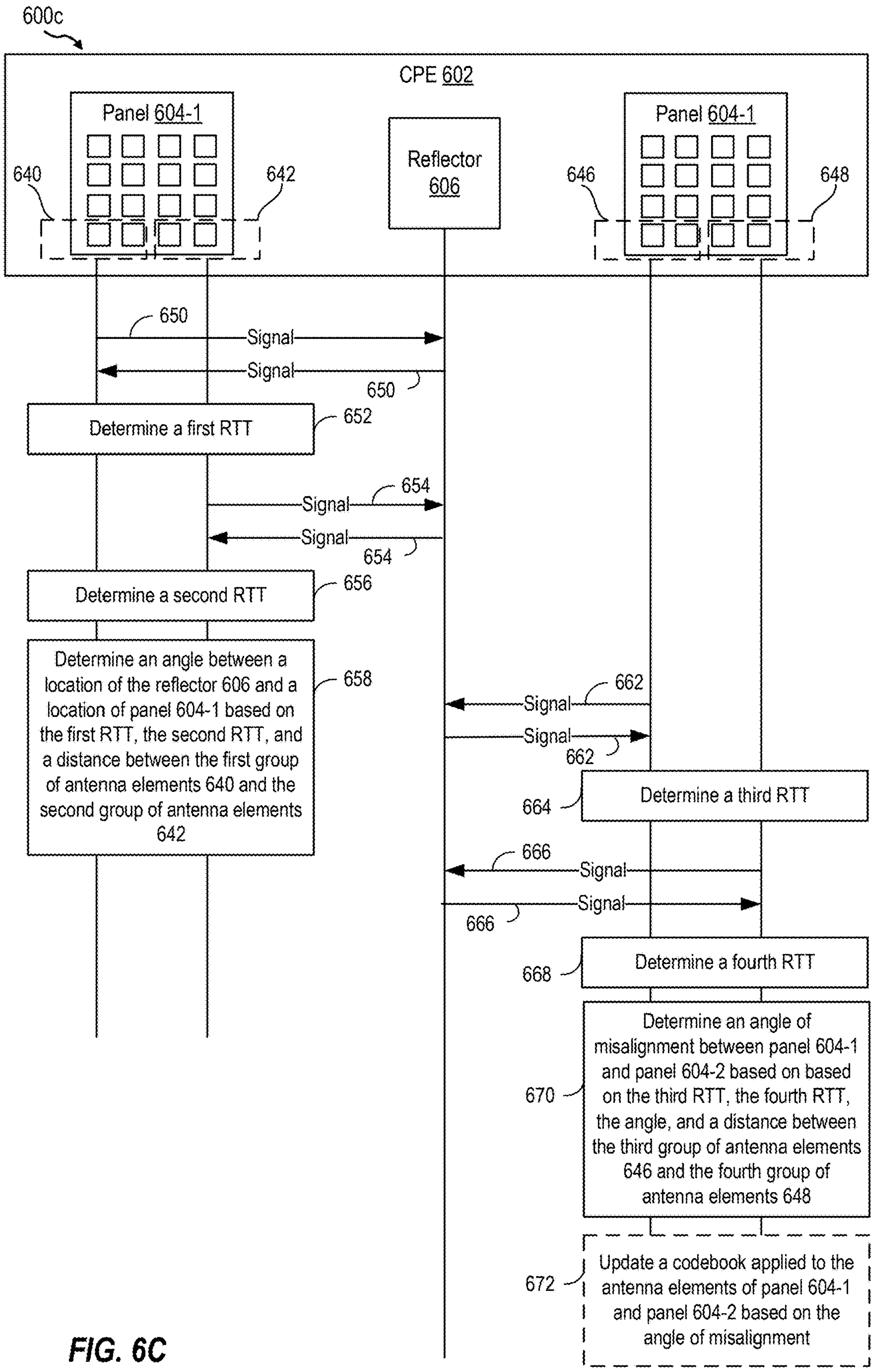
FIG. 6C depicts other example process flow for communications in a network between the two antenna panels depicted in FIG. 6A to determine an angle of misalignment between the two antenna panels.

FIG. 6A depicts example misalignment 600*a* between two panels: panel 604-1 and panel 604-2 (e.g., belonging to a same CPE 602, as shown in FIGS. 6B and 6C). As shown, a centerline of panel 604-1 (e.g., shown by the line representing panel 604-1) may intersect a centerline of panel 604-2 (e.g., shown by the line representing panel 604-2) at an angle, φ. This angle, φ, may represent the angular misalignment, also referred to herein as the "angle of misalignment," between panels 604-1, 604-2. In certain aspects, the angle of misalignment between panel 604-1 and panel 604-2 may be used (1) to determine whether a codebook update is needed, and, in some cases, (2) to update the codebook, such as when necessary, such as at least to improve performance, increase array gain, and/or increase EIRP.

A first method for determining the angle of misalignment, such as the angle of misalignment, p, between panel 604-1 and panel 604-2 in FIG. 6A, is depicted in FIG. 6B. The first method may include sending a radio signal (e.g., a beamformed signal) from panel 604-1 to panel 604-2 and determining the angle of misalignment, p, between panel 604-1 and panel 604-2 based on one or more signal characteristics of the radio signal received at panel 604-2.

A second method for determining the angle of misalignment, such as the angle of misalignment, φ, between panel 604-1 and panel 604-2 in FIG. 6A, is depicted in FIG. 6C. The second method may include (1) calculating RTTs of radio signals (e.g., beamformed signals) transmitted from and reflected back to panel 604-1, via a reflector, and (2) calculating RTTs of radio signals (e.g., beamformed signals) transmitted from and reflected back to panel 604-2, via the reflector. The angle of misalignment, φ, between panel 604-1 and panel 604-2 may be determined based on at least the calculated RTTs.

A third method for determining the angle of misalignment, such as the angle of misalignment, φ, between panel 604-1 and panel 604-2 in FIG. 6A, may use one or more sensors. More specifically, CPE including panel 604-1 and panel 604-2 may include one or more sensors. Example sensor(s) may include gyroscope(s), image sensor(s) (e.g., such as camera(s)), and/or light detection and ranging (LiDAR) sensor(s), to name a few. The CPE may use the sensor(s) to obtain sensor information indicating a location and/or an orientation of panel 604-1 and/or panel 604-2. This sensor information may then be used to determine the angle of misalignment, φ, between panel 604-1 and panel 604-2.

In certain aspects, for any of the aforementioned methods, the determined angle of misalignment may be used to update a codebook such that CPE performance, and more specifically antenna performance of the CPE, is improved even when panels of the CPE are misaligned. Put differently, the update to the codebook may help to compensate for misalignment between a CPE's panels such that CPE communication is improved.

Example Signaling for a First Panel Misalignment Mitigation Method

FIG. 6B depicts a process flow 600*b* for communications in a network between two CPE panels, such as misaligned panels 604-1, 604-2 of CPE 602 (e.g., the misaligned illustrated in FIG. 6A, using a reflector 606. CPE 602 may be an example of first wireless device 102 depicted and described with respect to FIG. 1. Further, CPE 602 may be an example of CPE 402 depicted and described with respect to FIG. 4.

As described herein, process flow 600*b* in FIG. 6B may be used to determine an angle of misalignment between misaligned panel 604-1 and panel 604-2.

Note that any operations or signaling illustrated with dashed lines in FIG. 6B may indicate that that operation or signaling is an optional or alternative example.

Process flow 600*b* in FIG. 6B begins, at 620, with a first subset of antenna elements 612 associated with panel 604-1 sending a signal (e.g., a beamformed radio signal) to a second subset of antenna elements 614 associated with panel 604-2. The signal may be sent to the second subset of antenna elements 614 via a reflector 606. The first subset of antenna elements 612 may include one or more antenna elements of panel 604-1. For example, the first subset of antenna elements 612 may include N antenna elements of panel 604-1. The second subset of antenna elements 614 may include one or more antenna elements of panel 604-2. For example, the second subset of antenna elements 614 may include M antenna elements of panel 604-2.

The beam weights applied to the first subset of antenna elements 612 may cause the first subset of antenna elements 612 to transmit the signal in a steered direction at a first angle, $\theta_0$, relative to a boresight direction of panel 604-1. A steered direction of the signal relative to the boresight direction of panel 604-1 is illustrated in FIG. 6A. The boresight direction of panel 604-1 may refer to the direction of maximum gain (e.g., direction of maximum radiated power) for panel 604-1.

The second subset of antenna elements 614 may receive the signal, and at 622, determine a signal characteristic for the received. For example, the second subset of antenna elements 614 may perform one or more measurements for the signal and determine a signal strength, a reference signal received power (RSRP), a reference signal received quality (RSRQ), a reference signal strength indicator (RSSI), a SNR, or a signal-to-interference-and-noise ratio (SINR) for the signal. In this example, the second subset of antenna elements 614 may determine a SNR for the received signal. In some other examples, the second subset of antenna elements 614 may determine one or more other signal characteristics.

At 624, the second subset of antenna elements 614 may determine an angle of misalignment between panel 604-1 and panel 604-2 based on the determined signal characteristic (e.g., SNR).

In certain aspects (e.g., for an Option 1 at 626), the angle of misalignment, go, may be computed using an equation. For example, when the signal characteristic determined for the signal comprises the SNR for the signal, the below equation may be used to calculate θ:

$$SNR(\theta) = \frac{1}{N} \cdot \left| \frac{\sin\left(\frac{\pi N d(\sin(\theta) - \sin(\theta_0))}{\lambda}\right)}{\sin\left(\frac{\pi d(\sin(\theta) - \sin(\theta_0))}{\lambda}\right)} \right|^2$$

where θ may then be used as input the equation:

$$\theta = \varphi + \pi + \theta_0$$

to solve for the angle of misalignment, φ. In the above equations, N may represent the number of antenna elements in the first subset of antenna elements 612, d may represent a set of spacings (e.g., distances) between each antenna element in the first subset of antenna elements 612, $\theta_0$ may represent the first angle between the steered direction of the signal and the boresight direction of panel 604-1, and λ may represent the wavelength of the signal transmitted.

In certain aspects (e.g., for an Option 2 at 628), the angle of misalignment, go, may be determined using a table (e.g., a lookup table) providing a plurality of mappings between a plurality of values for a first signal characteristic and a plurality of misalignment angles. For example, one example table may include mappings between different values of SNR measured for a signal and corresponding misalignment angles. Put differently, there may be a 1:1 mapping between signal SNR and misalignment angles. This example relationship is shown at 632 in FIG. 6B. Specifically, as the measured SNR decreases, the angle of misalignment, φ, increases, and vice versa. Using this table and the SNR determined for the signal, the angle of misalignment, φ, may be determined at 624, and more specifically at 628.

In certain aspects, the mappings of the table used to determine the angle of misalignment, φ, may be based on the first subset of antenna elements 612 used to send the signal, the second subset of antenna elements 614 used to receive the signal, a set of beam weights applied to the first subset of antenna elements 612, and a set of beam weights applied to the second subset of antenna elements 614. In other words, multiple tables may be created to provide mappings between signal characteristics (e.g., such as SNR) and angles of misalignments with a granularity based on the above factors.

In some cases, at 630, the determined angle of misalignment is used to update a codebook applied to antenna elements of panel 604-1 and/or panel 604-2 to compensate for the misalignment. For example, performing the update to the codebook may be based on the angle of misalignment determined at 624 (and 626 or 628). In some cases, the codebook may be updated only if the angle of misalignment satisfies a threshold angle of misalignment.

Example Signaling for a Second Panel Misalignment Mitigation Method

FIG. 6C depicts a process flow 600*c* for communications in a network between antenna elements of two CPE panels, such as misaligned panels 604-1, 604-2 of CPE 602 (e.g., the misaligned illustrated in FIG. 6A, using a reflector 606. CPE 602 may be an example of first wireless device 102 depicted and described with respect to FIG. 1. CPE 602 may be an example of CPE 402 depicted and described with respect to FIG. 4.

As described herein, process flow 600*c* in FIG. 6C may be used to determine an angle of misalignment between misaligned panel 604-1 and panel 604-2.

Note that any operations or signaling illustrated with dashed lines in FIG. 6C may indicate that that operation or signaling is an optional or alternative example.

Process flow 600*c* in FIG. 6C begins, at 650, with a first group of antenna elements 640 associated with panel 604-1 sending a first signal (e.g., a beamformed radio signal). The first signal may be reflected, via a reflector 606, such that it is returned to and received by the first group of antenna elements 640. At 652, a first RTT ($\tau_1$) is determined for the first signal sent from panel 604-1 and received back at panel 604-1, at 650.

At 654, a second group of antenna elements 642 associated with panel 604-1 may send a second signal (e.g., a beamformed radio signal). The second signal may be reflected, via the reflector 606, such that it is returned to and received by the second group of antenna elements 642. At 656, a second RTT ($\tau_2$) is determined for the second signal sent from panel 604-1 and received back at panel 604-1, at 654.

The first group of antenna elements 640 may include one or more antenna elements of panel 604-1. The second group of antenna elements 642 may include one or more antenna elements of panel 604-1. Antenna elements in the first group of antenna elements 640 and/or in the second group of antenna elements 642 may be distinct antenna elements of panel 604-1.

At 658, an angle (θ) between a location of the reflector 606 and a location of panel 604-1 may be determined using the equation:

$$|\tau_1 - \tau_2| = \frac{2d\cos(\theta)}{c}$$

where $\tau_1$ represents the first RTT, $\tau_2$ represents the second RTT, d represents a distance between the first group of antenna elements 640 and the second group of antenna elements 642, and c represents the speed of light.

Process flow 600*c* then proceeds, at 662, with a third group of antenna elements 646 associated with panel 604-2 sending a third signal (e.g., a beamformed radio signal). The third signal may be reflected, via the reflector 606, such that it is returned to and received by the third group of antenna elements 646. At 664, a third RTT ($\tau_3$) is determined for the third signal sent from panel 604-2 and received back at panel 604-2, at 662.

At 666, a fourth group of antenna elements 648 associated with panel 604-2 may send a fourth signal (e.g., a beamformed radio signal). The fourth signal may be reflected, via the reflector 606, such that it is returned to and received by the fourth group of antenna elements 648. At 668, a fourth RTT ($\tau_4$) is determined for the fourth signal sent from panel 604-2 and received back at panel 604-2, at 666.

The third group of antenna elements 646 may include one or more antenna elements of panel 604-2. The fourth group of antenna elements 648 may include one or more antenna elements of panel 604-2. Antenna elements in the third group of antenna elements 646 and/or in the fourth group of antenna elements 648 may be distinct antenna elements of panel 604-1.

At 670, an angle of misalignment, φ, between panel 604-1 and panel 604-2 is determined using the equation:

$$|\tau_3 - \tau_4| = \frac{2d_1\cos(\theta + \varphi)}{c}$$

where $\tau_3$ represents the third RTT, $\tau_4$ represents the fourth RTT, $d_1$ represents a distance between the third group of antenna elements 646 and the fourth group of antenna elements 648, θ represents the angle computed at 658, and c represents the speed of light.

In some cases, at 672, the determined angle of misalignment is used to update a codebook applied to antenna elements of panel 604-1 and/or panel 604-2 to compensate for the misalignment. For example, performing the update to the codebook may be based on the angle of misalignment determined at 670. In some cases, the codebook may be updated only if the angle of misalignment satisfies a threshold angle of misalignment.

Example Operations

Figure 7:
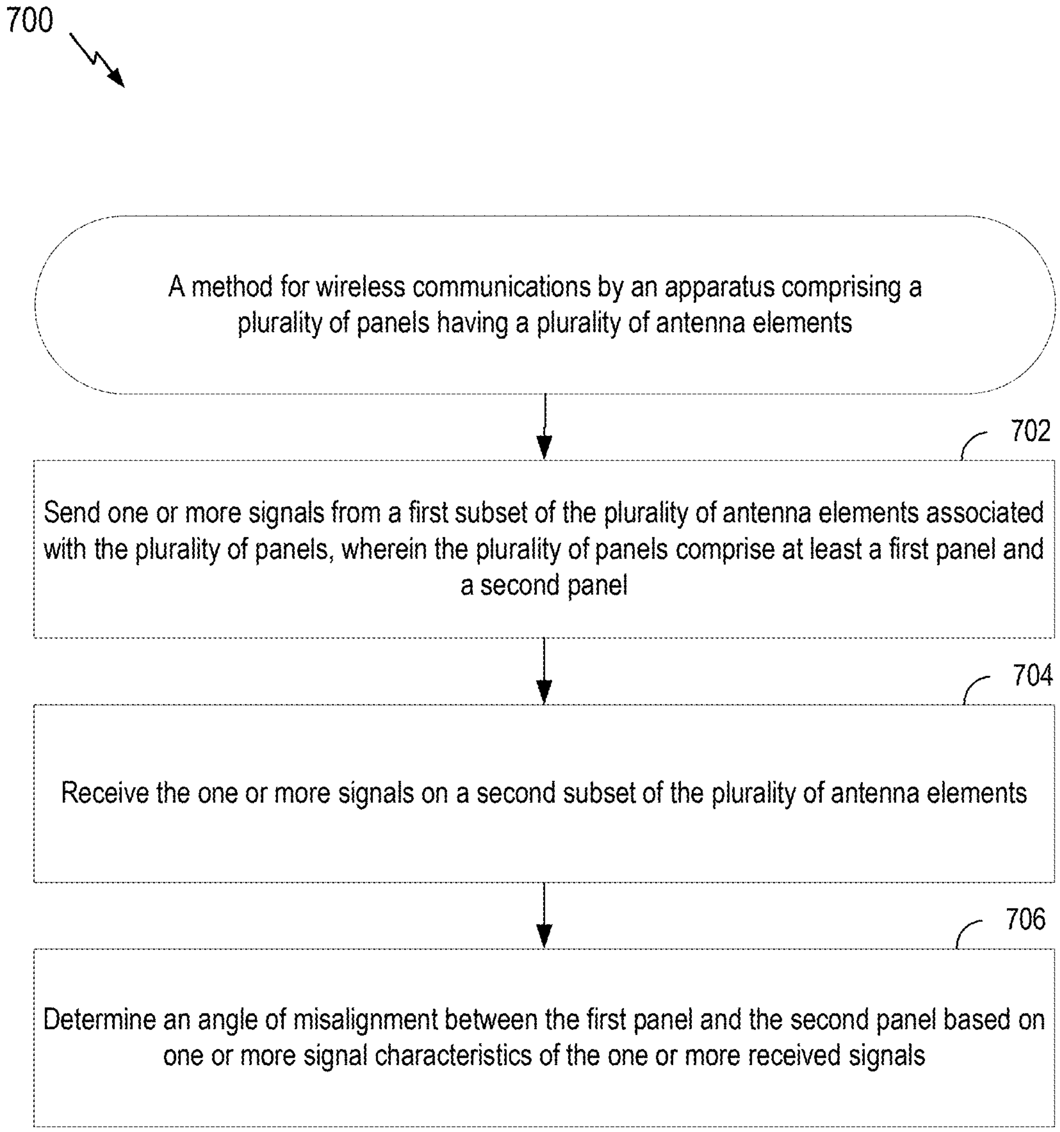
FIG. 7 depicts an example method for wireless communications by an apparatus.

FIG. 7 illustrates an example method 700 for wireless communication by an apparatus, such as a wireless device (e.g., the first wireless device 102 in the wireless communications system 100). The method 700 may be implemented as software components that are executed and run on one or more processors (e.g., the modem 210 and/or the processor 212 of FIG. 2). Further, the transmission and/or reception of signals by the wireless device in the method 700 may be enabled, for example, by one or more antennas (e.g., the antenna 220 of FIG. 2). In certain aspects, the transmission and/or reception of signals by the wireless device may be implemented via a bus interface of one or more processors (e.g., the modem 210 and/or the processor 212 of FIG. 2) obtaining and/or outputting signals for reception or transmission.

The apparatus may include a plurality of panels having a plurality of antenna elements. The plurality of panels may include at least a first panel and a second panel. In certain aspects, the apparatus may be a CPE including multiple antenna panels.

The method 700 may begin, at block 702, with sending one or more signals from a first subset of the plurality of antenna elements associated with the plurality of panels.

Method 700 may proceed, at block 704, with receiving the one or more signals on a second subset of the plurality of antenna elements.

Method 700 may proceed, at block 706, with determining an angle of misalignment between the first panel and the second panel based on one or more signal characteristics of the one or more received signals.

In certain aspects, method 700 further includes determining the angle of misalignment satisfies a threshold angle of misalignment; and based on the determination, updating a beamforming codebook applied to the plurality of antenna elements based on the angle of misalignment.

In certain aspects, the first subset of the plurality of antenna elements are associated with the first panel. In certain aspects, the second subset of the plurality of antenna elements are associated with the second panel. In certain aspects, sending the one or more signals at block 702 includes sending a signal in a steered direction at a first angle relative to a boresight direction of the first panel.

In certain aspects, the first subset of the plurality of antenna elements consists of a single first antenna element associated with the first panel; and the second subset of the plurality of antenna elements consists of a single second antenna element associated with the second panel.

In certain aspects, the first subset of the plurality of antenna elements includes a first plurality of antenna elements associated with the first panel; and the second subset of the plurality of antenna elements includes a second plurality of antenna elements associated with the second panel.

In certain aspects, the one or more signal characteristics of the signal include at least one of: a signal strength, a reference signal received power (RSRP), a reference signal received quality (RSRQ), a reference signal strength indicator (RSSI), a signal-to-noise ratio (SNR), a signal-to-interference-and-noise ratio (SINR).

In certain aspects, determining the angle of misalignment at block 706 includes determining the angle of misalignment based on a table providing a plurality of mappings between a plurality of values for a first signal characteristic and a plurality of misalignment angles.

In certain aspects, the plurality of mappings in the table are based on: the first subset of the plurality of antenna elements; the second subset of the plurality of antenna elements; a set of beam weights used to send the signal; and a set of beam weights used to receive the signal.

In certain aspects, determining the angle of misalignment at block 706 includes computing the angle of misalignment based on at least: a number of antenna elements included in the first subset of the plurality of antenna elements; a set of spacings between each antenna element in the first subset of the plurality of antenna elements; and the first angle.

In certain aspects, sending the one or more signals at block 702 includes: sending a first signal from a first group of antenna elements in the first subset of the plurality of antenna elements, the first group of antenna elements being associated with the first panel; sending a second signal from a second group of antenna elements in the first subset of the plurality of antenna elements, the second group of antenna elements being associated with the first panel; sending a third signal from a third group of antenna elements in the first subset of the plurality of antenna elements, the third group of antenna elements being associated with the second panel; and sending a fourth signal from a fourth group of antenna elements in the first subset of the plurality of antenna elements, the fourth group of antenna elements being associated with the second panel.

In certain aspects, the first subset of the plurality of antenna elements and the second subset of the plurality of antenna elements are the same. In certain aspects, receiving the one or more signals at block 704 includes: receiving, via a reflector, the first signal on the first group of antenna elements; receiving, via the reflector, the second signal on the second group of antenna elements; receiving, via the reflector, the third signal on the third group of antenna elements; and receiving, via the reflector, the fourth signal on the fourth group of antenna elements.

In certain aspects, the first group of antenna elements and the second group of antenna elements are separated by a first distance. In certain aspects, the third group of antenna elements and the fourth group of antenna elements are separated by a second distance. In certain aspects, determining the angle of misalignment at block 706 includes: determining a first round-trip time (RTT) for the first signal; determining a second RTT for the second signal; determining an angle between a location of the reflector and a location of the first panel based on the first RTT, the second RTT, and the first distance; determining a third RTT for the third signal; determining a fourth RTT for the fourth signal; and determining the angle of misalignment based on the third RTT, the fourth RTT, the second distance, and the angle.

In certain aspects, the apparatus further comprises one or more sensors. In certain aspects, method 700 further includes obtaining, via the one or more sensors, sensor information indicating at least one of a location or an orientation of one or more of the plurality of panels, wherein determining the angle of misalignment comprises determining the angle of misalignment based on the sensor information.

In certain aspects, the one or more sensors comprise at least one of: a gyroscope; an image sensor; or a light detection and ranging (LiDAR) sensor.

Figure 8:
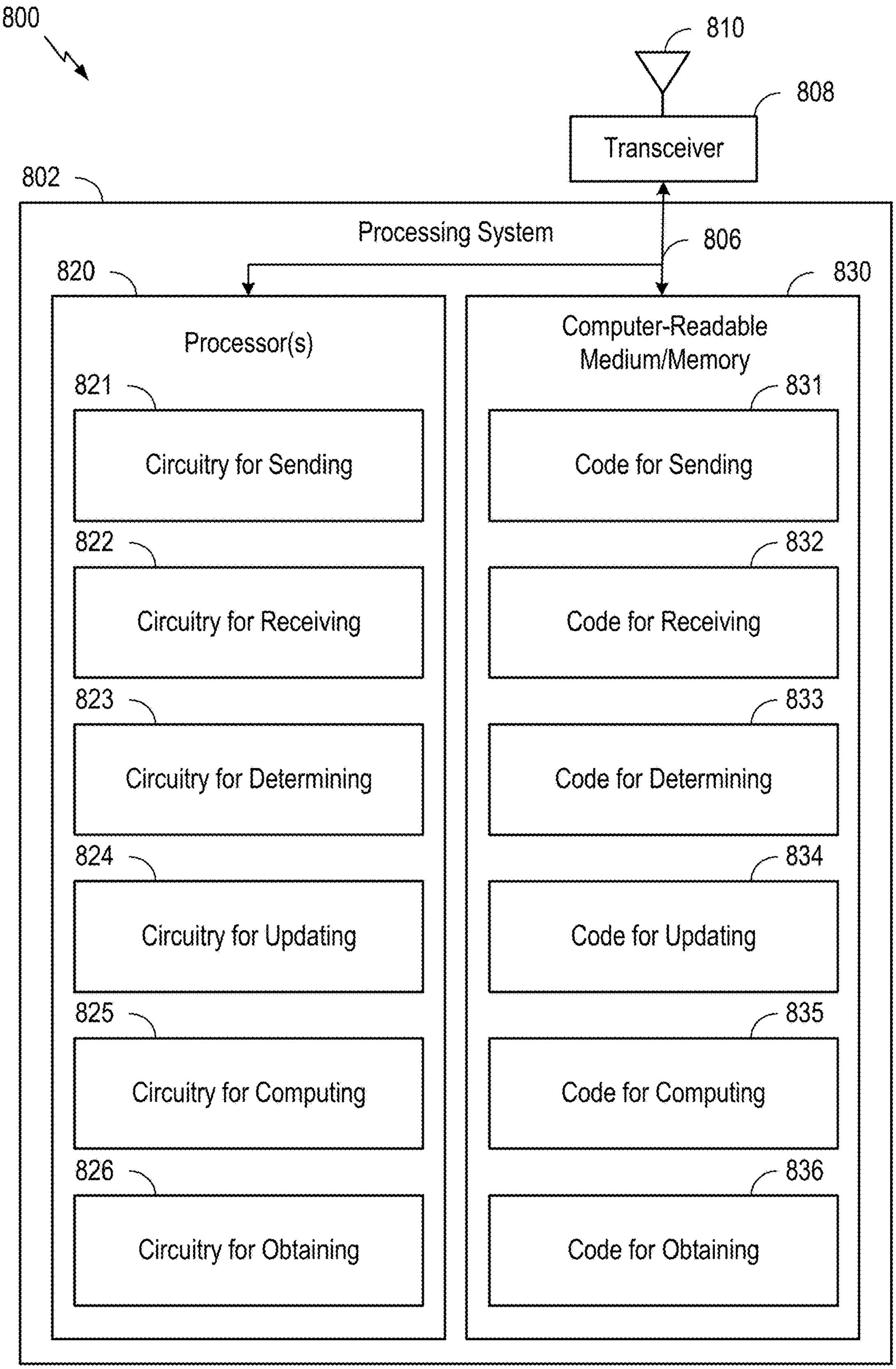
FIG. 8 depicts a communications device that may include various components configured to perform operations for the techniques disclosed herein.

In one aspect, method 700, or any aspect related to it, may be performed by an apparatus, such as communications device 800 of FIG. 8, which includes various components operable, configured, or adapted to perform the method 700. Communications device 800 is described below in further detail.

Note that FIG. 7 is just one example of a method, and other methods including fewer, additional, or alternative operations are possible consistent with this disclosure.

Example Communications Device

FIG. 8 depicts aspects of an example communications device 800. In some aspects, communications device 800 is a wireless communication device, such as the first wireless device 102 described above with respect to FIGS. 1 and 2. In some aspects, communications device 800 is an example CPE.

The communications device 800 includes a processing system 802 coupled to a transceiver 808 (e.g., a transmitter and/or a receiver). The transceiver 808 is configured to transmit and receive signals for the communications device 800 via an antenna 810, such as the various signals described herein. The processing system 802 may be configured to perform processing functions for the communications device 800, including processing signals received and/or to be transmitted by the communications device 800.

The processing system 802 includes one or more processors 820. In various aspects, the one or more processors 820 may be representative of any of the modem 210 and/or the processor 212, as described with respect to FIG. 2. The one or more processors 820 are coupled to a computer-readable medium/memory 830 via a bus 806. In certain aspects, the computer-readable medium/memory 830 is configured to store instructions (e.g., computer-executable code) that when executed by the one or more processors 820, cause the one or more processors 820 to perform the method 700 described with respect to FIG. 7, or any aspect related to the operations described herein. Note that reference to a processor performing a function of communications device 800 may include one or more processors performing that function of communications device 800. Reference to one or more processors performing multiple functions may include any one of the one or more processors performing any one of the multiple functions.

In the depicted example, computer-readable medium/memory 830 stores code (e.g., executable instructions) for sending 831, code for receiving 832, code for determining 833, code for updating 834, code for computing 835, code for obtaining 836, or any combination thereof. Processing of the code 831-836 may cause the communications device 800 to perform the method 700 described with respect to FIG. 7, or any aspect related to operations described herein.

The one or more processors 820 include circuitry configured to implement (e.g., execute) the code stored in the computer-readable medium/memory 830, including circuitry for sending 821, circuitry for receiving 822, circuitry for determining 823, circuitry for updating 824, circuitry for computing 825, circuitry for obtaining 826, or any combination thereof. Processing with circuitry 821-826 may cause the communications device 800 to perform the method 700 described with respect to FIG. 7, or any aspect related to operations described herein.

Various components of the communications device 800 may provide means for performing the method 700 described with respect to FIG. 7, or any aspect related to operations described herein. For example, means for transmitting, sending or outputting for transmission may include the TX path 218 and/or antenna(s) 220 of the first wireless device 102 illustrated in FIG. 2 and/or transceiver 808 and antenna 810 of the communications device 800 in FIG. 8. Means for receiving or obtaining may include the RX path 222 and/or antenna(s) 220 of the first wireless device illustrated in FIG. 2 and/or transceiver 808 and antenna 810 of the communications device 800 in FIG. 8. Means for determining, updating, or computing may include one or more processors, such as the modem 210 and/or processor 212 depicted in FIG. 2 and/or the processor(s) 820 in FIG. 8.

EXAMPLE CLAUSES

Implementation examples are described in the following numbered clauses:

Clause 1: A method for wireless communication by an apparatus comprising a plurality of panels, comprising: sending one or more signals from a first subset of a plurality of antenna elements associated with the plurality of panels, wherein the plurality of panels comprise at least a first panel and a second panel; receiving the one or more signals on a second subset of the plurality of antenna elements; and determining an angle of misalignment between the first panel and the second panel based on one or more signal characteristics of the one or more received signals.

Clause 2: The method of Clause 1, further comprising: determining the angle of misalignment satisfies a threshold angle of misalignment; and based on the determination, updating a beamforming codebook applied to the plurality of antenna elements based on the angle of misalignment.

Clause 3: The method of any one of Clauses 1-2, wherein: the first subset of the plurality of antenna elements are associated with the first panel; the second subset of the plurality of antenna elements are associated with the second panel; and sending the one or more signals comprises sending a signal in a steered direction at a first angle relative to a boresight direction of the first panel.

Clause 4: The method of Clause 3, wherein: the first subset of the plurality of antenna elements consists of a single first antenna element associated with the first panel; and the second subset of the plurality of antenna elements consists of a single second antenna element associated with the second panel.

Clause 5: The method of any one of Clauses 3-4, wherein: the first subset of the plurality of antenna elements comprises a first plurality of antenna elements associated with the first panel; and the second subset of the plurality of antenna elements comprises a second plurality of antenna elements associated with the second panel.

Clause 6: The method of any one of Clauses 3-5, wherein the one or more signal characteristics of the signal comprise at least one of: a signal strength, a reference signal received power (RSRP), a reference signal received quality (RSRQ), a reference signal strength indicator (RSSI), a signal-to-noise ratio (SNR), a signal-to-interference-and-noise ratio (SINR).

Clause 7: The method of any one of Clauses 3-6, wherein determining the angle of misalignment comprises determining the angle of misalignment based on a table providing a plurality of mappings between a plurality of values for a first signal characteristic and a plurality of misalignment angles.

Clause 8: The method of Clause 7, wherein the plurality of mappings in the table are based on: the first subset of the plurality of antenna elements; the second subset of the plurality of antenna elements; a set of beam weights used to send the signal; and a set of beam weights used to receive the signal.

Clause 9: The method of any one of Clauses 3-8, wherein determining the angle of misalignment comprises computing the angle of misalignment based on at least: a number of antenna elements included in the first subset of the plurality of antenna elements; a set of spacings between each antenna element in the first subset of the plurality of antenna elements; and the first angle.

Clause 10: The method of any one of Clauses 1-9, wherein sending the one or more signals comprises: sending a first signal from a first group of antenna elements in the first subset of the plurality of antenna elements, the first group of antenna elements being associated with the first panel; sending a second signal from a second group of antenna elements in the first subset of the plurality of antenna elements, the second group of antenna elements being associated with the first panel; sending a third signal from a third group of antenna elements in the first subset of the plurality of antenna elements, the third group of antenna elements being associated with the second panel; and sending a fourth signal from a fourth group of antenna elements in the first subset of the plurality of antenna elements, the fourth group of antenna elements being associated with the second panel.

Clause 11: The method of Clause 10, wherein: the first subset of the plurality of antenna elements and the second subset of the plurality of antenna elements are the same; and receiving the one or more signals comprises: receiving, via a reflector, the first signal on the first group of antenna elements; receiving, via the reflector, the second signal on the second group of antenna elements; receiving, via the reflector, the third signal on the third group of antenna elements; and receiving, via the reflector, the fourth signal on the fourth group of antenna elements.

Clause 12: The method of Clause 11, wherein: the first group of antenna elements and the second group of antenna elements are separated by a first distance; the third group of antenna elements and the fourth group of antenna elements are separated by a second distance; and determining the angle of misalignment comprises: determining a first round-trip time (RTT) for the first signal; determining a second RTT for the second signal; determining an angle between a location of the reflector and a location of the first panel based on the first RTT, the second RTT, and the first distance; determining a third RTT for the third signal; determining a fourth RTT for the fourth signal; and determining the angle of misalignment based on the third RTT, the fourth RTT, the second distance, and the angle.

Clause 13: The method of any one of Clauses 1-12, wherein: the apparatus further comprises one or more sensors; and the method further comprises: obtaining, via the one or more sensors, sensor information indicating at least one of a location or an orientation of one or more of the plurality of panels, wherein determining the angle of misalignment comprises determining the angle of misalignment based on the sensor information.

Clause 14: The apparatus of Clause 13, wherein the one or more sensors comprise at least one of: a gyroscope; an image sensor; or a light detection and ranging (LiDAR) sensor.

Clause 15: One or more apparatuses, comprising: one or more memories comprising executable instructions; and one or more processors configured to execute the executable instructions and cause the one or more apparatuses to perform a method in accordance with any one of clauses 1-14.

Clause 16: One or more apparatuses, comprising: one or more memories; and one or more processors, coupled to the one or more memories, configured to cause the one or more apparatuses to perform a method in accordance with any one of Clauses 1-14.

Clause 17: One or more apparatuses, comprising: one or more memories; and one or more processors, coupled to the one or more memories, configured to perform a method in accordance with any one of Clauses 1-14.

Clause 18: One or more apparatuses, comprising means for performing a method in accordance with any one of Clauses 1-14.

Clause 19: One or more non-transitory computer-readable media comprising executable instructions that, when executed by one or more processors of one or more apparatuses, cause the one or more apparatuses to perform a method in accordance with any one of Clauses 1-14.

Clause 20: One or more computer program products embodied on one or more computer-readable storage media comprising code for performing a method in accordance with any one of Clauses 1-14.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a microcontroller, a microprocessor, a general purpose processor, an artificial intelligence (AI) processor, a digital signal processor (DSP), an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), a system in package (SiP), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

The invention claimed is:

1. A customer premises equipment (CPE) configured for wireless communications, comprising:

a plurality of panels comprising a plurality of antenna elements, wherein;

the plurality of panels comprise at least a first panel and a second panel of the CPE; and the first panel and the second panel are configured to be located within the CPE and communicate with one or more nodes;

one or more memories; and one or more processors, coupled to the one or more memories, configured to cause the CPE to:

send one or more signals from a first subset of the plurality of antenna elements;

receive the one or more signals on a second subset of the plurality of antenna elements; and determine an angle of misalignment between the first panel and the second panel based on one or more signal characteristics of the one or more received signals.

2. The CPE of claim 1, wherein the one or more processors are configured to cause the CPE to:

determine the angle of misalignment satisfies a threshold angle of misalignment; and based on the determination, update a beamforming codebook applied to the plurality of antenna elements based on the angle of misalignment.

3. The CPE of claim 1, wherein:

the first subset of the plurality of antenna elements are associated with the first panel;

the second subset of the plurality of antenna elements are associated with the second panel; and to send the one or more signals, the one or more processors are configured to cause the CPE to send a signal in a steered direction at a first angle relative to a boresight direction of the first panel.

4. The CPE of claim 3, wherein:

the first subset of the plurality of antenna elements consists of a single first antenna element associated with the first panel; and the second subset of the plurality of antenna elements consists of a single second antenna element associated with the second panel.

5. The CPE of claim 3, wherein:

the first subset of the plurality of antenna elements comprises a first plurality of antenna elements associated with the first panel; and the second subset of the plurality of antenna elements comprises a second plurality of antenna elements associated with the second panel.

6. The CPE of claim 3, wherein the one or more signal characteristics of the signal comprise at least one of:

a signal strength;

a reference signal received power (RSRP);

a reference signal received quality (RSRQ);

a reference signal strength indicator (RSSI);

a signal-to-noise ratio (SNR); or a signal-to-interference-and-noise ratio (SINR).

7. The CPE of claim 3, wherein to determine the angle of misalignment, the one or more processors are configured to cause the CPE to determine the angle of misalignment based on a table providing a plurality of mappings between a plurality of values for a first signal characteristic and a plurality of misalignment angles.

8. The CPE of claim 7, wherein the plurality of mappings in the table are based on:

the first subset of the plurality of antenna elements;

the second subset of the plurality of antenna elements;

a set of beam weights used to send the signal; and a set of beam weights used to receive the signal.

9. The CPE of claim 3, wherein to determine the angle of misalignment, the one or more processors are configured to cause the CPE to compute the angle of misalignment based on at least:

a number of antenna elements included in the first subset of the plurality of antenna elements;

a set of spacings between each antenna element in the first subset of the plurality of antenna elements; and the first angle.

10. The CPE of claim 1, wherein to send the one or more signals, the one or more processors are configured to cause the CPE to:

send a first signal from a first group of antenna elements in the first subset of the plurality of antenna elements, the first group of antenna elements being associated with the first panel;

send a second signal from a second group of antenna elements in the first subset of the plurality of antenna elements, the second group of antenna elements being associated with the first panel;

send a third signal from a third group of antenna elements in the first subset of the plurality of antenna elements, the third group of antenna elements being associated with the second panel; and send a fourth signal from a fourth group of antenna elements in the first subset of the plurality of antenna elements, the fourth group of antenna elements being associated with the second panel.

11. The CPE of claim 10, wherein:

the first subset of the plurality of antenna elements and the second subset of the plurality of antenna elements are the same; and to receive the one or more signals, the one or more processors are configured to cause the CPE to:

receive, via a reflector, the first signal on the first group of antenna elements;

receive, via the reflector, the second signal on the second group of antenna elements;

receive, via the reflector, the third signal on the third group of antenna elements; and receive, via the reflector, the fourth signal on the fourth group of antenna elements.

12. The CPE of claim 11, wherein:

the first group of antenna elements and the second group of antenna elements are separated by a first distance;

the third group of antenna elements and the fourth group of antenna elements are separated by a second distance; and to determine the angle of misalignment, the one or more processors are configured to cause the CPE to:

determine a first round-trip time (RTT) for the first signal;

determine a second RTT for the second signal;

determine an angle between a location of the reflector and a location of the first panel based on the first RTT, the second RTT, and the first distance;

determine a third RTT for the third signal;

determine a fourth RTT for the fourth signal; and determine the angle of misalignment based on the third RTT, the fourth RTT, the second distance, and the angle.

13. The CPE of claim 1, further comprising one or more sensors, wherein:

the one or more processors are configured to cause the CPE to obtain, via the one or more sensors, sensor information indicating at least one of a location or an orientation of one or more of the plurality of panels; and to determine the angle of misalignment, the one or more processors are configured to cause the CPE to determine the angle of misalignment based on the sensor information.

14. The CPE of claim 13, wherein the one or more sensors comprise at least one of:

a gyroscope;

an image sensor; or a light detection and ranging (LiDAR) sensor.

15. A method for wireless communications by customer premises equipment (CPE) comprising a plurality of panels having a plurality of antenna elements, the method comprising:

sending one or more signals from a first subset of the plurality of antenna elements associated with the plurality of panels, wherein;

the plurality of panels comprise at least a first panel and a second panel of the CPE; and the first panel and the second panel are configured to be located within the CPE and communicate with one or more nodes;

receiving the one or more signals on a second subset of the plurality of antenna elements; and determining an angle of misalignment between the first panel and the second panel based on one or more signal characteristics of the one or more received signals.

16. The method of claim 15, further comprising:

determining the angle of misalignment satisfies a threshold angle of misalignment; and based on the determination, updating a beamforming codebook applied to the plurality of antenna elements based on the angle of misalignment.

17. The method of claim 15, wherein:

the first subset of the plurality of antenna elements are associated with the first panel;

the second subset of the plurality of antenna elements are associated with the second panel; and sending the one or more signals comprises sending a signal in a steered direction at a first angle relative to a boresight direction of the first panel.

18. The method of claim 17, wherein:

the first subset of the plurality of antenna elements consists of a single first antenna element associated with the first panel; and the second subset of the plurality of antenna elements consists of a single second antenna element associated with the second panel.

19. One or more non-transitory computer-readable media comprising executable instructions that, when executed by one or more processors of computer premises equipment (CPE) comprising a plurality of panels having a plurality of antenna elements, cause the CPE to perform operations comprising:

sending one or more signals from a first subset of the plurality of antenna elements associated with the plurality of panels, wherein;

the plurality of panels comprise at least a first panel and a second panel of the CPE; and the first panel and the second panel are configured to be located within the CPE and communicate with one or more nodes;

receiving the one or more signals on a second subset of the plurality of antenna elements; and determining an angle of misalignment between the first panel and the second panel based on one or more signal characteristics of the one or more received signals.

20. The CPE of claim 1, wherein to cause to send the one or more signals, the one or more processors are configured to cause the CPE to send a signal in a direction of a reflector that is separate from the plurality of panels.

* * * * *